(12) United States Patent
Fukuda

(10) Patent No.: US 11,831,835 B2
(45) Date of Patent: Nov. 28, 2023

(54) IMAGE PROCESSING SYSTEM FOR TRANSMITTING IMAGE DATA TO ALTERNATIVE DESTINATION, CONTROL METHOD FOR THE IMAGE PROCESSING SYSTEM, AND STORAGE MEDIUM

(71) Applicant: CANON KABUSHIKI KAISHA, Tokyo (JP)

(72) Inventor: Masato Fukuda, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/732,633

(22) Filed: Apr. 29, 2022

(65) Prior Publication Data

US 2022/0377200 A1 Nov. 24, 2022

(30) Foreign Application Priority Data

May 18, 2021 (JP) ................................. 2021-084037

(51) Int. Cl.
*H04N 1/00* (2006.01)
*H04N 1/32* (2006.01)

(52) U.S. Cl.
CPC ..... *H04N 1/32662* (2013.01); *H04N 1/00209* (2013.01); *H04N 1/32368* (2013.01)

(58) Field of Classification Search
CPC ........... H04N 1/32662; H04N 1/00209; H04N 1/32368
See application file for complete search history.

(56) References Cited

U.S. PATENT DOCUMENTS

| | | | | |
|---|---|---|---|---|
| 11,431,873 B2* | 8/2022 | Oyoshi | ............. | H04N 1/00307 |
| 2011/0228346 A1* | 9/2011 | Hoshino | ............ | H04N 1/32694 |
| | | | | 358/442 |
| 2012/0086965 A1* | 4/2012 | Kang | ...................... | G06F 3/126 |
| | | | | 358/1.15 |
| 2013/0229673 A1* | 9/2013 | Nakayama | ......... | H04N 1/00127 |
| | | | | 358/1.13 |
| 2015/0288855 A1* | 10/2015 | Ge | ........................ | G06F 21/629 |
| | | | | 358/1.14 |
| 2018/0213114 A1* | 7/2018 | Utsumi | ............. | H04N 1/00307 |
| 2021/0067642 A1* | 3/2021 | Kawaguchi | ........ | H04N 1/00456 |

FOREIGN PATENT DOCUMENTS

JP 2008109479 A 5/2008

* cited by examiner

*Primary Examiner* — Benjamin O Dulaney
(74) *Attorney, Agent, or Firm* — ROSSI, KIMMS & McDOWELL LLP

(57) ABSTRACT

An image processing system that is capable of retrying transmission of image data without limiting execution of other jobs in an image processing apparatus. An instruction to execute a job which reads an original, generates image data of the original, and sends the image data to a user-specified destination, is received from a user. An information processing apparatus generates a command for executing the job and sends the command to the image processing apparatus. The image processing apparatus executes the job based on the command. When sending of the image data to the user-specified destination is unsuccessful, the image processing apparatus sends the image data to the information processing apparatus. In accordance with an instruction received from the user, the information processing apparatus sends the image data to the user-specified destination.

7 Claims, 24 Drawing Sheets

*FIG. 10*

```
POST /scanJob HTTP/1.1
Host:192.168.1.100
Content-Type: text/xml
Content-Length:514

<?xml version="1.0" encoding="UTF-8"?>
    <ScanJob>
        <ColorMode>Color</ColorMode>
        <Resolution>300</Resolution>
        <Input>Feeder</Input>
        <Destination>
            <Uri>https://aaa.com/Storage1</Uri>

<Password>dXNlcjE6cGFzc3dvcmQx</Password>
        </Destination>
        <DestinationMyself>
            <Uri>https://192.168.1.100/scan</Uri>

<Password>b3duZXI6cGFzc3dvcmQy</Password>
        </DestinationMyself>
    </ScanJob>
```

*FIG. 11*

```
HTTP/1.1 200 OK
Content-Type: text/xml
Content-Length:96

<?xml version="1.0" encoding="UTF-8"?>
    <StateURI>http://192.168.1.100/jobState?id=1</StateURI>
```

FIG. 12A

HTTP/1.1 200 OK
Content-Type: text/xml
Content-Length:150

```xml
<?xml version="1.0" encoding="UTF-8"?>
<ScannerStatus>
    <State>Scanning</State>
    <ScanPage>3</ScanPage>
    <JobResult>Processing</JobResult>
</ScannerStatus>
```

FIG. 12B

HTTP/1.1 200 OK
Content-Type: text/xml
Content-Length:179

```xml
<?xml version="1.0" encoding="UTF-8"?>
<ScannerStatus>
    <State>Idle</State>
    <ScanPage>5</ScanPage>
    <JobResult>HostSendSuccess</JobResult>
    <Reason>Permissions</Reason>
</ScannerStatus>
```

FIG. 12C

HTTP/1.1 200 OK
Content-Type: text/xml
Content-Length:173

```xml
<?xml version="1.0" encoding="UTF-8"?>
<ScannerStatus>
    <State>Idle</State>
    <ScanPage>5</ScanPage>
    <JobResult>SendError</JobResult>
    <Reason>Permissions</Reason>
</ScannerStatus>
```

FIG. 12D

HTTP/1.1 200 OK
Content-Type: text/xml
Content-Length:143

```xml
<?xml version="1.0" encoding="UTF-8"?>
<ScannerStatus>
    <State>Idle</State>
    <ScanPage>5</ScanPage>
    <JobResult>Success</JobResult>
</ScannerStatus>
```

*FIG. 13*

```
HTTP/1.1 403 Forbidden
Content-Type: text/xml
Content-Length:88

<?xml version="1.0" encoding="UTF-8"?>
   <Result>Error</Result>
   <Reason>Permissions</Reason>
```

*FIG. 16*

```
POST /Storage1 HTTP/1.1
Host: aaa.com:443
Authentication: Basic dXNlcjE6cGFzc3dvcmQx
Content-Type: application/pdf
Content-Length: 34246

```
HTTP/1.1 200 OK
Content-Type: text/xml
Content-Length:91

<?xml version="1.0" encoding="UTF-8"?>
    <ScannerCap>
        <SpoolCap>True</SpoolCap>
    </ScannerCap>
```

FIG. 19B

```
HTTP/1.1 200 OK
Content-Type: text/xml
Content-Length:92

<?xml version="1.0" encoding="UTF-8"?>
    <ScannerCap>
        <SpoolCap>False</SpoolCap>
    </ScannerCap>
```

*FIG. 20A*

```
POST /scanJob HTTP/1.1
Host:192.168.1.100
Content-Type: text/xml
Content-Length:312

<?xml version="1.0" encoding="UTF-8"?>
   <ScanJob>
      <ColorMode>Color</ColorMode>
      <Resolution>300</Resolution>
      <Input>Feeder</Input>
      <Destination>
         <Uri>https://aaa.com/Storage1</Uri>
         <Password>dXNlcjE6cGFzc3dvcmQx</Password>
      </Destination>
   </ScanJob>
```

*FIG. 20B*

```
POST /scanJob HTTP/1.1
Host:192.168.1.100
Content-Type: text/xml
Content-Length:327

<?xml version="1.0" encoding="UTF-8"?>
   <ScanJob>
      <ColorMode>Color</ColorMode>
      <Resolution>300</Resolution>
      <Input>Feeder</Input>
      <Destination>
         <Uri>https://192.168.1.100/scan</Uri>
         <Password>b3duZXI6cGFzc3dvcmQy</Password>
      </Destination>
   </ScanJob>
```

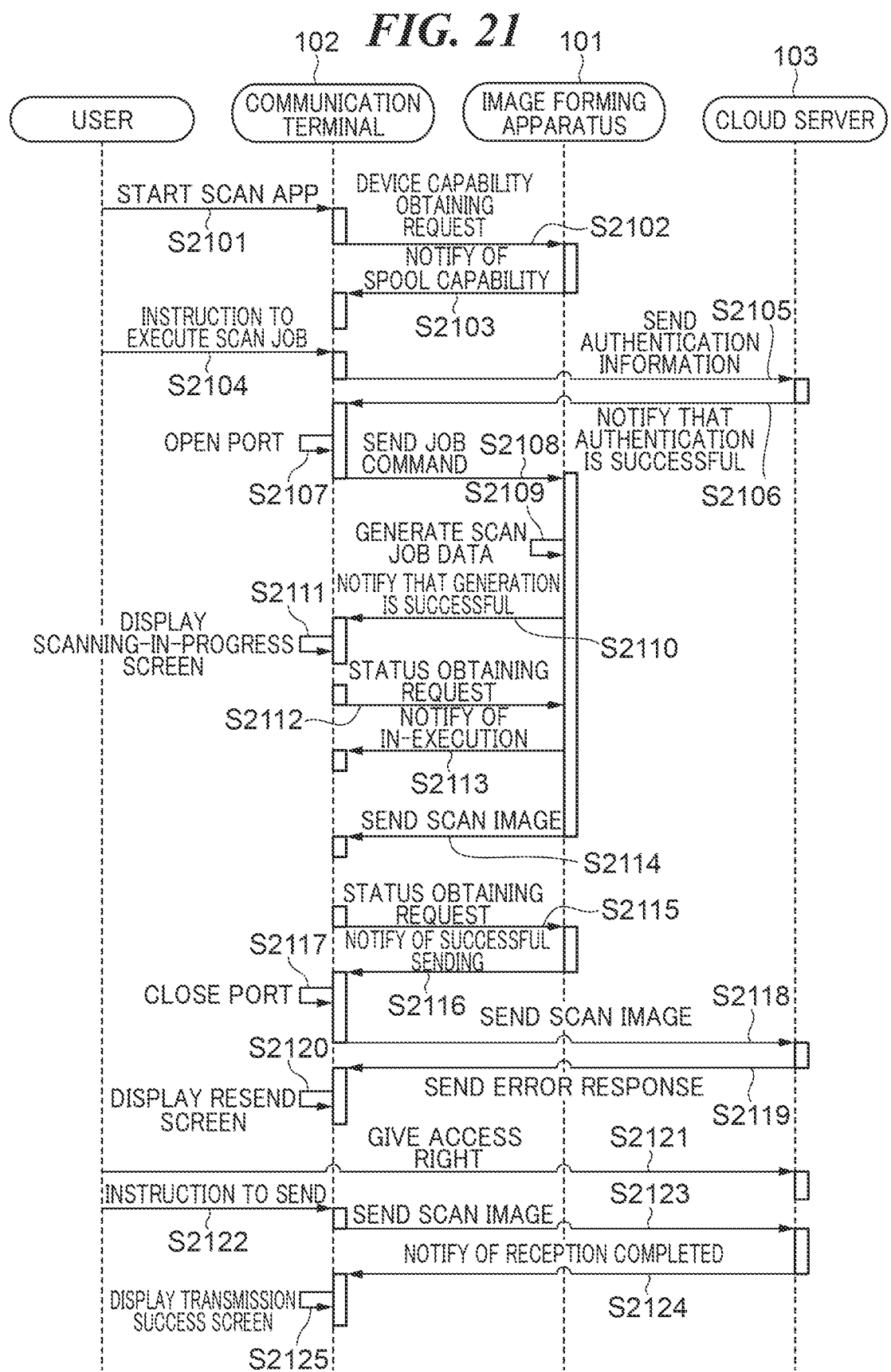

# IMAGE PROCESSING SYSTEM FOR TRANSMITTING IMAGE DATA TO ALTERNATIVE DESTINATION, CONTROL METHOD FOR THE IMAGE PROCESSING SYSTEM, AND STORAGE MEDIUM

BACKGROUND OF THE INVENTION

Field of the Invention

The present invention relates to an image processing system, a control method for the image processing system, and a storage medium.

Description of the Related Art

An image processing apparatus that executes a scan job according to a job command received from a communication terminal is known. By the scan job, the image processing apparatus generates image data by reading an original based on scan settings included in the job command. The image processing apparatus also sends the generated image data to a destination set in the job command.

According to a technique that has been disclosed, in such scan jobs, when the sending of the image data is unsuccessful due to a destination permission error, size error, or the like, the image data is stored in an internal memory of the image processing apparatus, and the transmission of the image data is retried (see Japanese Laid-Open Patent Publication (Kokai) No. 2008-109479).

However, if image data is stored in the internal memory of the image processing apparatus when the sending of the image data is unsuccessful, the internal memory is squeezed until the error is resolved, and hence execution of other jobs is restricted in the image processing apparatus.

SUMMARY OF THE INVENTION

The present invention provides an image processing system that is capable of retrying transmission of image data without limiting execution of other jobs in an image processing apparatus, a control method for the image processing system, and a storage medium.

Accordingly, the present invention provides an image processing system that has an information processing apparatus and an image processing apparatus, the image processing system comprising at least one memory that stores a set of instructions, and at least one processor that is configured to, based on the instructions, cause: the information processing apparatus to receive, from a user, an instruction to execute a job which reads an original, generates image data of the original, and sends the image data to a destination specified by the user, generate a command for executing the job, and send the command to the image processing apparatus; and the image processing apparatus to control execution of the job based on the command received from the information processing apparatus, and when sending of the image data to the destination specified by the user is unsuccessful, send the image data to the information processing apparatus, wherein the information processing apparatus sends, in accordance with an instruction received from the user, the image data received from the image processing apparatus to the destination specified by the user.

According to the present invention, transmission of image data can be retried without limiting execution of other jobs in the image processing apparatus.

Further features of the present invention will become apparent from the following description of exemplary embodiments with reference to the attached drawings.

BRIEF DESCRIPTION OF THE DRAWINGS

FIG. 10 is a view showing an example of a job command that is generated by the communication terminal in FIG. 1.

FIG. 11 is a view showing an example of HTTP response data that is sent to the communication terminal by the image forming apparatus in FIG. 1.

FIGS. 12A to 12D are views showing examples of HTTP response data that is sent to the communication terminal by the image forming apparatus in FIG. 1.

FIG. 13 is a view showing an example of a send error response that is sent to the image forming apparatus by a cloud server in FIG. 1.

FIG. 16 is a view showing an example of a POST request that is sent by the communication terminal in FIG. 1.

FIGS. 19A and 19B are views showing examples of a device capability response that is sent to the communication terminal by the image forming apparatus in FIG. 1.

FIGS. 20A and 20B are views showing examples of a job command that is generated by the communication terminal in the second embodiment.

FIG. 21 is a sequence diagram useful in explaining a process that is carried out when an image forming apparatus having no spooling capability is unsuccessful in sending a scan image in the second embodiment.

DESCRIPTION OF THE EMBODIMENTS

The present invention will now be described in detail below with reference to the accompanying drawings showing embodiments thereof. It should be noted that an image forming apparatus in the embodiments is an example of an image processing apparatus. Not all combinations of features in the embodiments described below should always be essential to solving problems of the present invention.

First, a description will be given of an image processing system and a control method therefor according to a first embodiment of the present invention.

Figure 1:
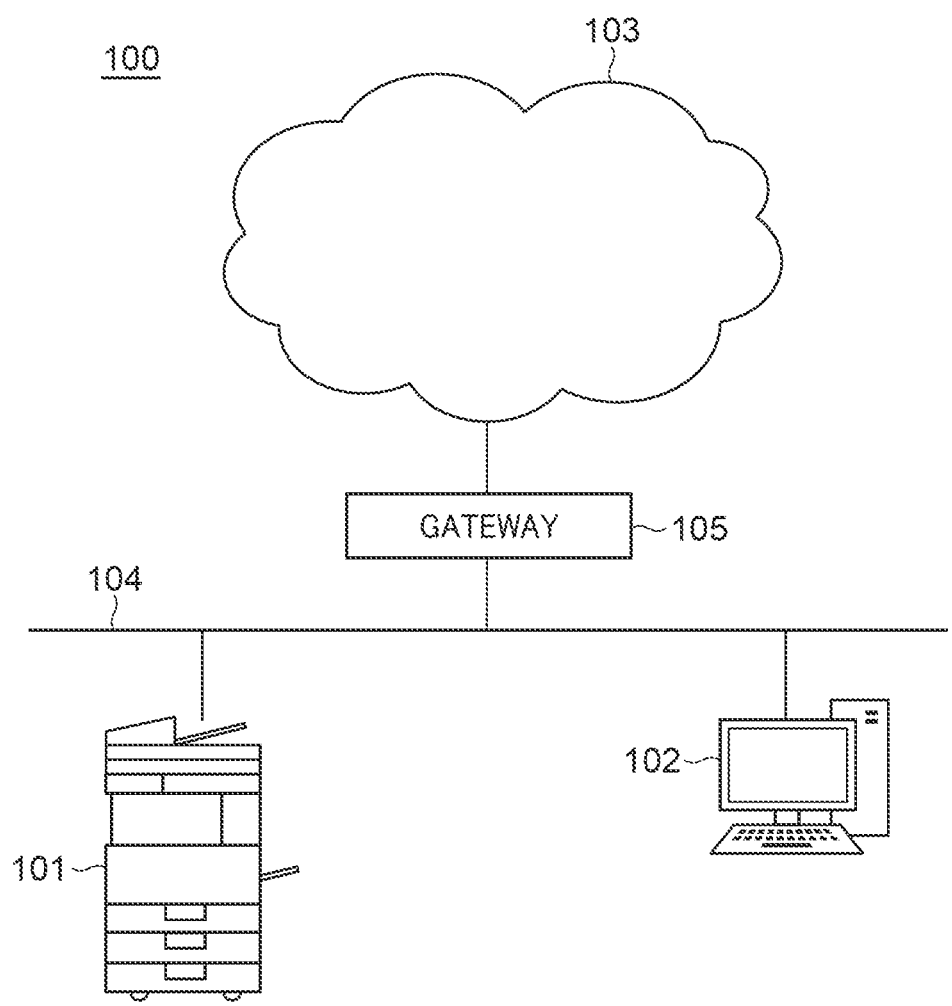
FIG. 1 is a diagram schematically showing an arrangement of an image processing system according to an embodiment of the present invention.

FIG. 1 is a diagram schematically showing an arrangement of the image processing system 100 according to the embodiment of the present invention.

Referring to FIG. 1, the image processing system 100 is comprised of an image forming apparatus 101, a communication terminal 102, and a cloud server 103. The image forming apparatus 101 and the communication terminal 102 are capable of communicating with each other via a network 104. The image forming apparatus 101 and the communication terminal 102 are capable of communicating with the cloud server 103 via the network 104 and a gateway 105. It should be noted that although in the present embodiment, the image processing system 100 is configured to have one image forming apparatus 101 and one communication terminal 102, the image processing system 100 should not be limited to this configuration. For example, the image processing system 100 may be equipped with a plurality of image forming apparatuses 101 and a plurality of communication terminals 102.

The image forming apparatus 101 is a multifunction peripheral equipped with a plurality of functions such as copying, scanning, printing, and faxing. The image forming apparatus 101, however, may be an apparatus quipped with a single function such as a printer or scanner. The communication terminal 102 is, for example, a personal computer (PC) that is used by a user. For example, the communication terminal 102 acts as an information processing apparatus to generate a job command for executing a scan job and send the job command to the image forming apparatus 101. The image forming apparatus 101 that has received the job command reads an original, which is a sheet medium, generates image data of the original (hereafter referred to as a "scan image"), and stores the scan image in a storage 205 (FIG. 2 to be described later) of the image forming apparatus 101. The image forming apparatus 101 sends the scan image to a destination set in the job command, for example, the communication terminal 102, the cloud server 103, or a device (not shown) on the network 104.

The cloud server 103 is comprised of one or more cloud servers and manages electronic files including scan images and others. For example, the cloud server 103 stores and manages electronic files received from the communication terminal 102 and the image forming apparatus 101. The network 104 connects the image forming apparatus 101, the communication terminal 102, and the gateway 105 to one another. The gateway 105 is a wireless LAN router conforming to the IEEE 802.11 standard series. The IEEE 802.11 standard series are a set of standards belonging to IEEE 802.11 such as IEEE 802.11a and IEEE 802.11b. It should be noted that the gateway 105 may have a capability of operating according to the other wireless communication methods. Moreover, the gateway 105 may be a wired LAN router conforming to Ethernet standards typified by 10BASE-T, 100BASE-T, 1000BASE-T, and so forth, instead of a wireless LAN router, and may have a capability of operating according to the other wired communication methods.

Figure 2:
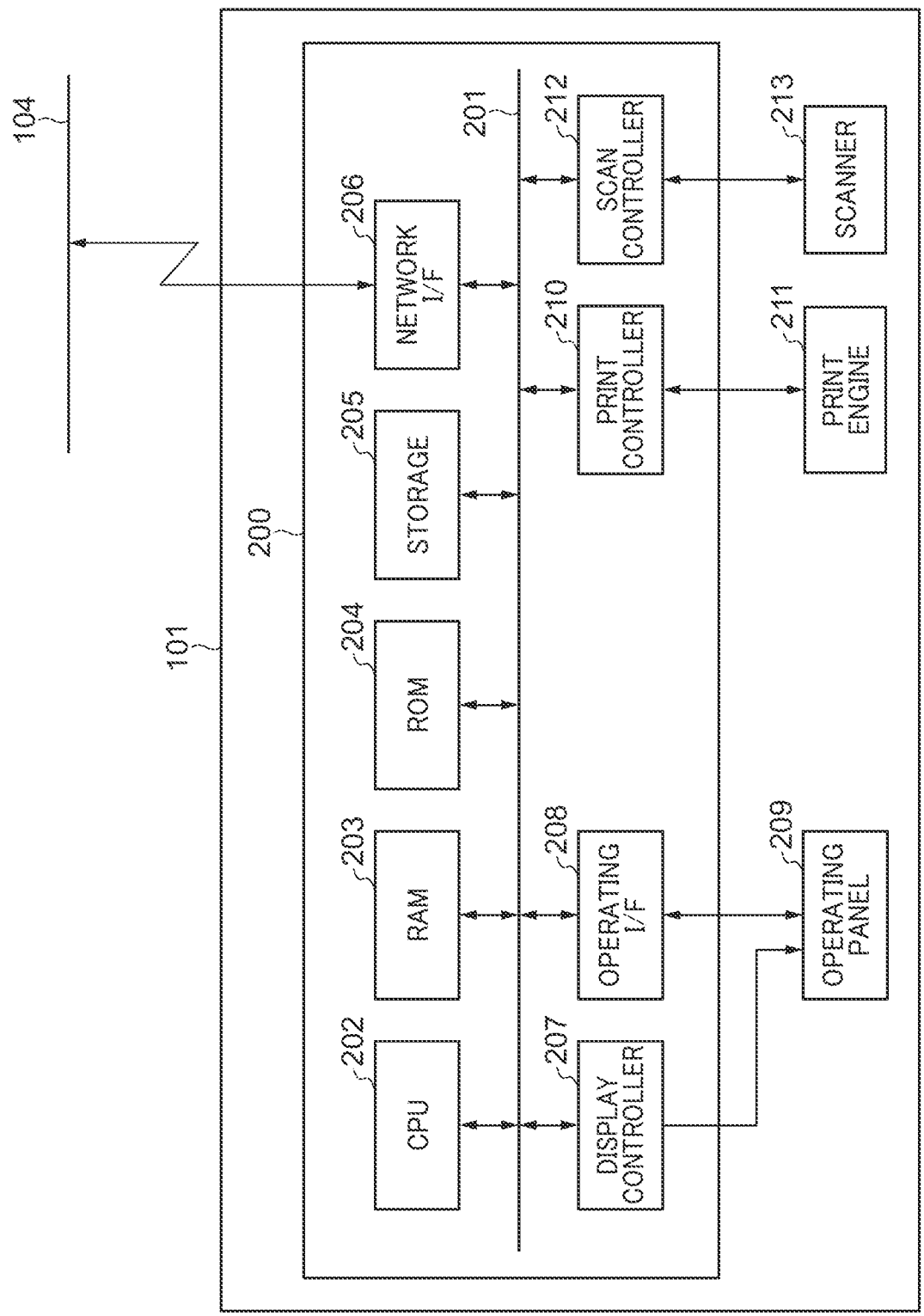
FIG. 2 is a block diagram schematically showing a hardware arrangement of an image forming apparatus in FIG. 1.

FIG. 2 is a block diagram schematically showing a hardware arrangement of the image forming apparatus 101 in FIG. 1. Referring to FIG. 2, the image forming apparatus 101 has a control unit 200, an operating panel 209, a print engine 211, and a scanner 213. The control unit 200 is connected to the operating panel 209, the print engine 211, and the scanner 213. The control unit 200 has a CPU 202, a RAM 203, a ROM 204, a storage 205, a network I/F 206, a display controller 207, an operating I/F 208, a print controller 210, and a scan controller 212. All of these components which the control unit 200 has are connected to one another via a system bus 201. It should be noted that CPU is an abbreviation for "central processing unit."

Figure 5:
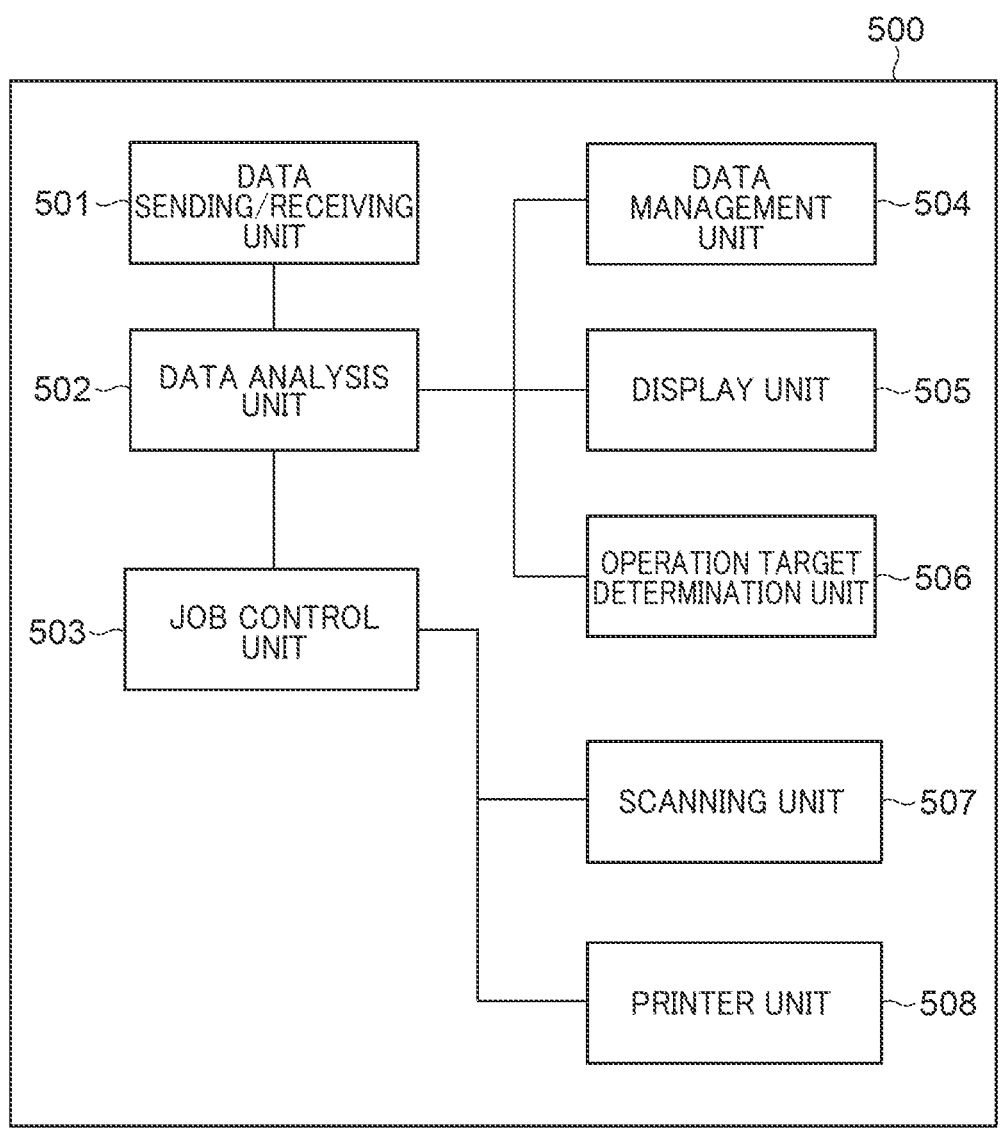
FIG. 5 is a block diagram schematically showing a functional arrangement of a device control program that is executed by a CPU in FIG. 2.

The CPU 202 controls the overall operation of the image forming apparatus 101. The CPU 202 reads control programs stored in the ROM 204 and the storage 205 to perform various types of control such as reading control and printing control. The RAM 203 is a main storage memory for the CPU 202. The RAM 203 is used as a work area and also used as a temporary storage area for deploying various control programs stored in the ROM 204 and the storage 205. The ROM 204 stores a plurality of control programs to be executed by the CPU 202 such as a device control program 500 (FIG. 5 to be described later). The storage 205 stores image data including print data, scan image, etc., various programs, and various setting information. It should be noted that in the present embodiment, one CPU 202 executes processes in flowcharts to be described later, using one memory (the RAM 203); however, another form may be used. For example, a plurality of CPUs, RAMs, ROMs, and storages may work in collaboration with one another to carry out the processes in the flowcharts to be described later. Some of the processes may be carried out using a hardware circuit such as an ASIC (Application-Specific Integrated Circuit) or an FPGA (Field-Programmable Gate Array).

The network I/F 206 is an interface for the image forming apparatus 101 to communicate with external apparatuses via the network 104. For example, the network I/F 206 sends a scan image, which is generated by the scanner 213 by scanning, to the cloud server 103 or an apparatus on the network 104. The display controller 207 and the operating I/F 208 are connected to the operating panel 209. Screens controlled by the operating I/F 208 are displayed on the operating panel 209. When a user operates the operating panel 209, the CPU 202 obtains an event corresponding to a user operation via the display controller 207.

The print controller 210 is connected to the print engine 211. The print controller 210 transfers a control command, which instructs to perform printing, and image data to the print engine 211. The print engine 211 forms an image on a sheet based on the received control command and image data. The print engine 211 may use, as the printing method, either the electrophotographic printing method or the inkjet method. When the printing method to be used is the electrophotographic printing method, the image forming apparatus 101 forms an image on a sheet by forming an electrostatic latent image on a photosensitive body (not shown) in the image forming apparatus 101, developing the electrostatic latent image with toner to form a toner image, transferring the toner image onto the sheet, and fixing the transferred toner image. On the other hand, when the printing method to be used is the inkjet method, the image forming apparatus 101 forms an image on a sheet by jetting ink.

The scan controller 212 is connected to the scanner 213. The scanner 213 reads an original to generate a scan image. The scan image generated by the scanner 213 is stored in the storage 205. The image forming apparatus 101 is capable of forming the scan image generated by the scanner 213 on a sheet. The scanner 213 has an original feeder (not shown) and is capable of reading originals placed on the original feeder while conveying them one by one.

Figure 3:
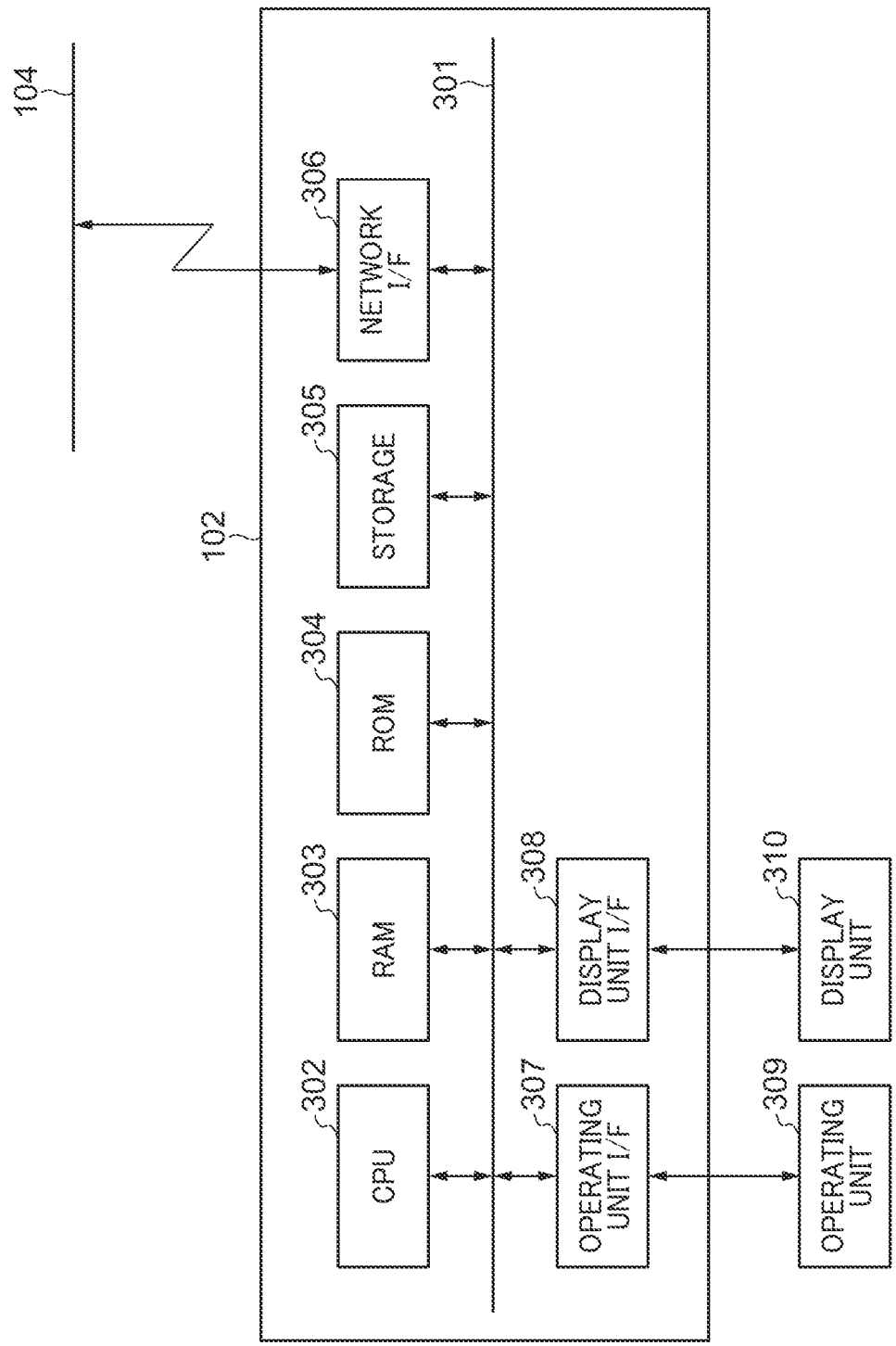
FIG. 3 is a block diagram schematically showing a hardware arrangement of a communication terminal in FIG. 1.

FIG. 3 is a block diagram schematically showing a hardware arrangement of the communication terminal 102 in FIG. 1. Referring to FIG. 3, the communication terminal 102 has a CPU 302, a RAM 303, a ROM 304, a storage 305, a network I/F 306, an operating unit I/F 307, and a display unit I/F 308. All of these components are connected to one another via a system bus 301.

Figure 6:
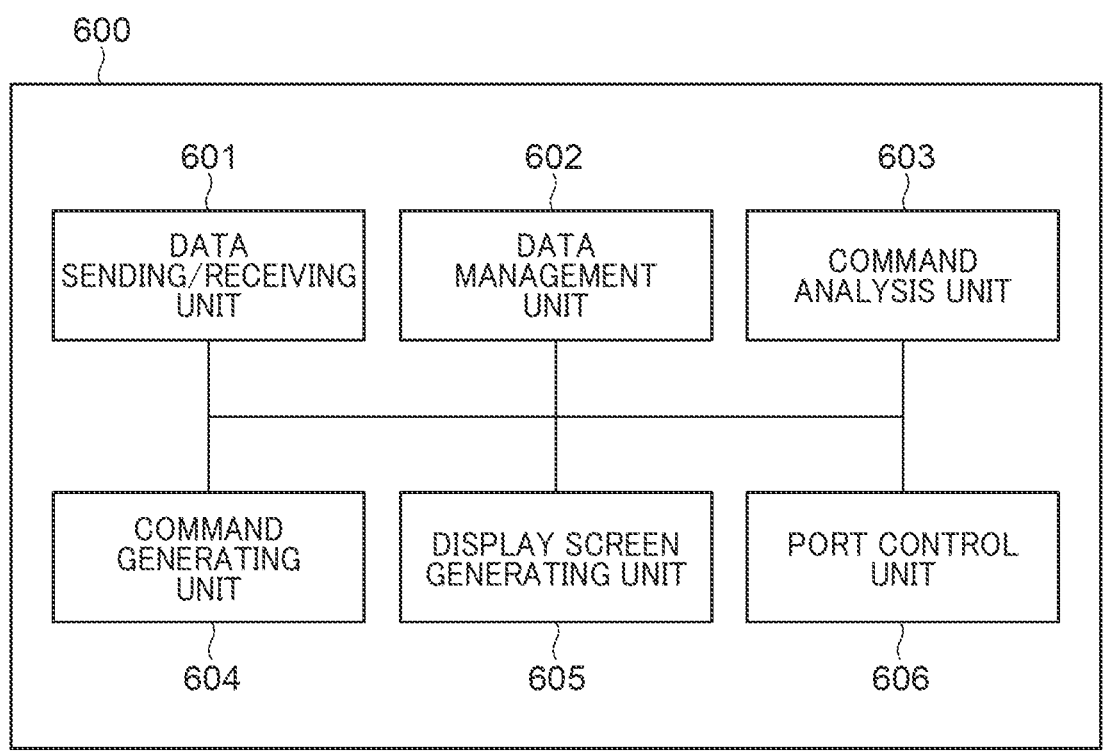
FIG. 6 is a block diagram schematically showing a functional arrangement of a scan app that is executed by a CPU in FIG. 3.

The CPU 302 is a central processing unit that controls the overall operation of the communication terminal 102. The RAM 303 is a volatile memory. The ROM 304 is a nonvolatile memory and stores a boot program for the CPU 302 and others. The storage 305 is a storage device having a larger storage capacity than that of the RAM 303 and is, for example, a hard disk drive (HDD). The storage 305 stores control programs to be executed by the CPU 302, for example, a scan app 600 (FIG. 6 to be described later). It should be noted that the storage 305 may be another storage device such as a solid-stage drive (SSD) having functions equivalent to those of a hard disk drive.

The CPU 302 executes the boot program stored in the ROM 304 when starting (e.g. turning on the power to) of the communication terminal 102. The boot program is a program for reading a control program stored in the storage 305 and developing the control program on the RAM 303. After executing the boot program, the CPU 302 subsequently executes the control program developed on the RAM 303 to perform control. The CPU 302 also stores data, which is used in executing the control program, on the RAM 303 and reads and writes the data. In the communication terminal 102, setting values required to execute the control program are stored on the storage 305, wherein the setting values are read and written by the CPU 302. The communication terminal 102 communicates with other devices on the network 104 via the network I/F 306. The communication terminal 102 is connected to an operating unit 309 such as a keyboard or mouse via the operating unit I/F 307 so as to receive instructions input by the user via the operating unit 309. The communication terminal 102, which is connected to a display unit 310 via the display unit I/F 308, is capable of displaying various screens on the display unit 310. In the present embodiment, it is assumed that "192.168.1.101" which is an example of an IP address of the image forming apparatus 101, and "192.168.1.100" which is an example of an IP address of the communication terminal 102, have already been stored in the storage 305. It is also assumed that information registered in advance on a destination registration screen (not shown) has already been stored in the storage 305. Examples of the information registered in advance on the destination registration screen include a request URI "/scanJob", which is a URI for the image forming apparatus 101 to receive a scan job via HTTP, URIs of respective destinations, and "user names" and "passwords" which are authentication information corresponding to the destinations. It should be noted that HTTP is an abbreviation for Hypertext Transfer Protocol. URI is an abbreviation for Uniform Resource Identifier.

Figure 4:
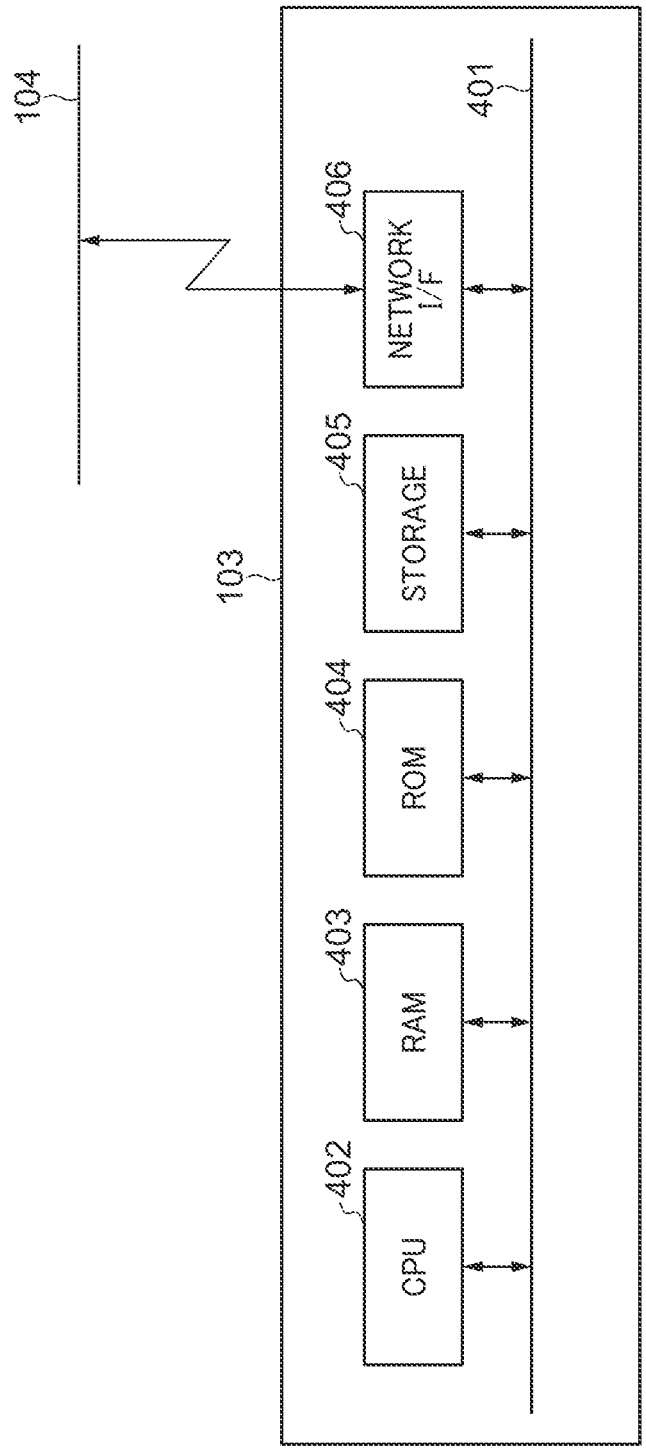
FIG. 4 is a block diagram schematically showing a hardware arrangement of a cloud server in FIG. 1.

FIG. 4 is a block diagram schematically showing a hardware arrangement of the cloud server 103 in FIG. 1. Referring to FIG. 4, the cloud server 103 has a CPU 402, a RAM 403, a ROM 404, a storage 405, and a network I/F 406. All of these components are connected to one another via a system bus 401.

Figure 7:
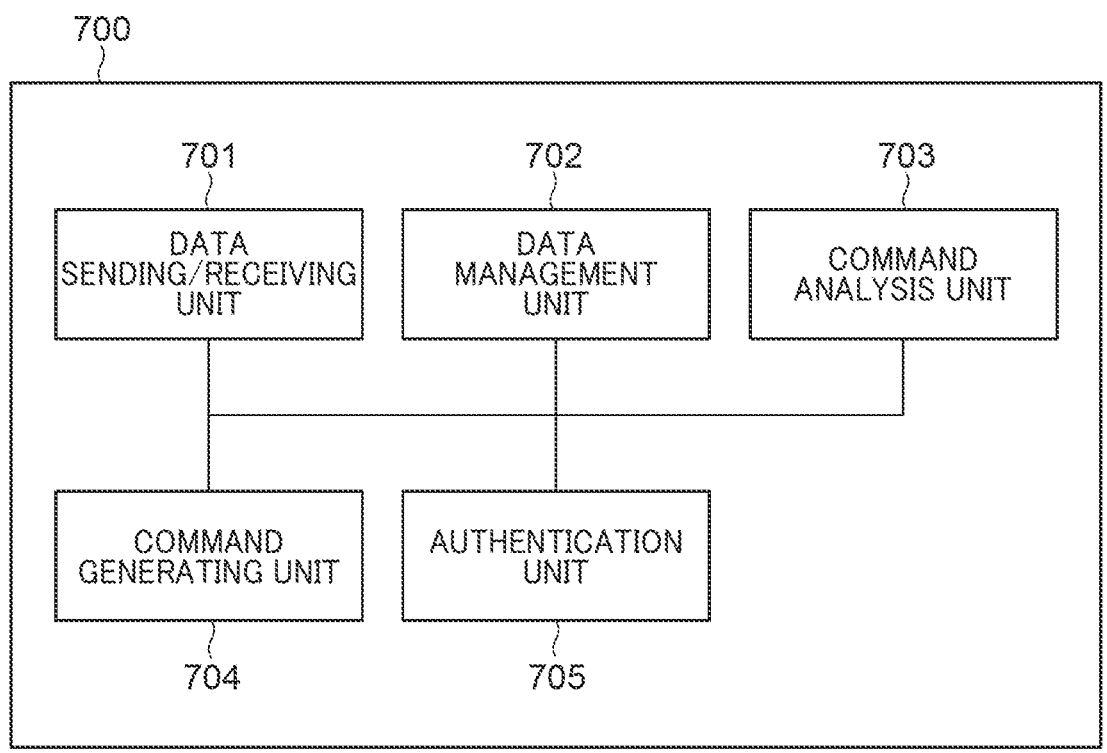
FIG. 7 is a block diagram schematically showing a functional arrangement of a storage service program that is executed by a CPU in FIG. 4.

The CPU 402 is a central processing unit that controls the overall operation of the cloud server 103. The RAM 403 is a volatile memory. The ROM 404 is a nonvolatile memory and stores a boot program for the CPU 402 and others. The storage 405 is a storage device having a larger storage capacity than that of the RAM 403 and is, for example, a hard disk drive (HDD). The storage 405 stores a plurality of control programs to be executed by the CPU 402, for example, a storage service program 700 (FIG. 7 to be described later). It should be noted that the storage 405 may be another storage device such as a solid-stage drive (SSD) having functions equivalent to those of a hard disk drive.

The CPU 402 executes the boot program stored in the ROM 404 when starting (e.g. turning on the power to) the cloud server 103. The boot program is a program for reading a control program stored in the storage 405 and developing the control program on the RAM 403. After executing the boot program, the CPU 402 subsequently executes the control program developed on the RAM 403 to perform control. The CPU 402 also stores data, which is used in executing the control program, on the RAM 403 and reads and writes the data. In the cloud server 103, setting values required to execute the control program are stored on the storage 405, wherein the setting values are read and written by the CPU 402. The cloud server 103 communicates with other devices on the network 104 via the network I/F 406.

FIG. 5 is a block diagram schematically showing a functional arrangement of the device control program 500 that is executed by the CPU 202 in FIG. 2. The device control program 500 is stored in the ROM 204 as described above. At startup of the image forming apparatus 101, the CPU 202 develops the device control program 500 on the RAM 203 and executes the same. Referring to FIG. 5, the device control program 500 is comprised of a data sending and receiving unit 501, a data analysis unit 502, a job control unit 503, a data management unit 504, a display unit 505, an operation target determination unit 506, a scanning unit 507, and a printer unit 508.

The data sending and receiving unit 501 is a module for the image forming apparatus 101 to send and receive data to and from other devices on the network 104 using TCP/IP via the network I/F 206. The image forming apparatus 101 uses the data sending and receiving unit 501 to, for example, receive device operation data generated by the cloud server 103. The image forming apparatus 101 sends. a job execution result, a screen update notification which indicates that contents displayed on a screen responding with device operation result is updated, a job execution status notification indicating a job status, and so forth to the cloud server 103.

The data analysis unit 502 converts the received device operation data into a command interpretable by each module in the device control program 500 and sends the command obtained as a result of the conversion to each module. The job control unit 503 issues instructions to control the print engine 211 via the print controller 210, and also issues instructions to control the scanner 213 via the scan controller 212. For example, upon detecting a depression of a start key by the user while a copy function screen (not shown) is being displayed on the display unit 505, the job control unit 503 receives parameters for a copy job and a job starting instruction from the operation target determination unit 506. The job control unit 503 executes the copy job based on the received parameters. By the copy job, the scanner 213 generates a scan image based on the received parameters, and the print engine 211 prints the scan image on a sheet based on the parameters.

The data management unit 504 stores work data, which is generated by executing the device control program 500, setting parameters required to control each device, and so forth in predetermined areas on the RAM 203 and the storage 205 and manages them. For example, the data management unit 504 manages job data that is comprised of a combination of setting items and setting values for a job to be executed by the job control unit 503, and language settings that are information indicating languages to be displayed on the operating panel 209. The data management unit 504 also manages authentication information required to communicate with the gateway 105, authentication information required to communicate with the cloud server 103, and so forth. Further, the data management unit 504 manages image data to be subjected to an image forming process by the image forming apparatus 101. The data management unit 504 also manages screen display control information that is used for the display unit 505 to control screen display, operation target determination information that is used for the operation target determination unit 506 to determine an operation target, and so forth for each screen displayed by the display unit 505.

The display unit 505 controls the operating panel 209 via the display controller 207. More specifically, the display unit 505 displays UI components which can be operated by the user, such as a button, drop-down list, and checkbox on the operating panel 209. The screen displayed on the operating panel 209 is updated based on screen display control information. The operation target determination unit 506 obtains a coordinate indicating a position touched by the user on the operating panel 209, from the operating panel 209 via the operating I/F 208. The operation target determination unit 506 judges, as an operation target, a UI component which can be operated by the user and is displayed on the operating panel 209 when a user's touch operation is detected. The operation target determination unit 506 reads screen display control information corresponding to the UI component judged as the operation target, and based on this screen display control information, determines what type of processing will be performed when a touch operation is received. For example, the operation target determination unit 506 outputs an instruction to update what is displayed on the screen to the display unit 505 and also outputs an instruction to start a job using parameters set by user operation to the job control unit 503.

Based on scan job parameter settings of the job control unit 503, the scanning unit 507 causes the scanner 213 to perform scanning via the scan controller 212 and stores a scan image obtained by the scanning into the data management unit 504. The printer unit 508 causes the print engine 211 to perform printing via the print controller 210 based on print job parameter settings of the job control unit 503.

FIG. 6 is a block diagram schematically showing a functional arrangement of the scan app 600 that is executed by the CPU 302 in FIG. 3. The scan app 600 is stored in the storage 305 as described above. At startup of the communication terminal 102, the CPU 302 develops the scan app 600 on the RAM 303 and executes the same. Referring to FIG. 6, the scan app 600 is comprised of a data sending and receiving unit 601, a data management unit 602, a command analysis unit 603, a command generating unit 604, a display screen generating unit 605, and a port control unit 606.

The data sending and receiving unit 601 is a module for the communication terminal 102 to send and receive data to and from other devices on the network 104 using HTTP via the network I/F 306. For example, the communication terminal 102 uses the data sending and receiving unit 601 to receive commands and image data from the image forming apparatus 101 and the cloud server 103. The communication terminal 102 also sends commands generated by the command generating unit 604 and image data stored in the storage 305 to destinations indicated by destination information stored in the data management unit 602.

The data management unit 602 stores a URI indicating the image forming apparatus 101, URIs indicating destinations of image data, authentication information on destinations of image data, image data received from the image forming apparatus 101, and so forth in predetermined areas on the storage 305, and manages them.

The command analysis unit 603 analyzes commands received via the data sending and receiving unit 601. A description will now be given of an example of analysis performed by the command analysis unit 603 in a case where HTTP response data in FIG. 12B, which will be described later, has been received. In this case, because the value of a "State" element in the HTTP response data is "Idle", the command analysis unit 603 determines that the state of the scanner 213 is "standing by". Moreover, because the value of a "ScanPage" element is "5", the command analysis unit 603 determines that the number of originals scanned is 5. Further, because the value of a "JobResult" element is "HostSendSuccess", the command analysis unit 603 determines that a job execution result is "successful sending to self-terminal". In addition, because the value of a "Reason" element is "Permissions", the command analysis unit 603 determines that the reason why a scan image could not be sent to the cloud server 103 is "access permission". The command analysis unit 603 stores these analysis results in the RAM 303.

The command generating unit 604 generates XML data that is to be sent to the image forming apparatus 101 and the cloud server 103. A description will now be given of an example in which the command generating unit 604 generates data in a case where a scanning instruction with settings configured on a scan setting screen 803 (FIG. 8 to be described later) is issued to the image forming apparatus 101. In this case, because a setting in a color mode specification list box 804 is "Color", the command generating unit 604 generates "<ColorMode>Color</ColorMode>". Moreover, because a setting in a resolution specification list box 805 is "300 dpi", the command generating unit 604 generates "<Resolution>300</Resolution>". Further, because a setting in an input method specification list box 806 is "Feeder", the command generating unit 604 generates "<Input>Feeder</Input>". The command generating unit 604 sets these generated character strings as elements in a "<ScanJob>" tag.

Then, because a setting in a destination specification list box 807 is "https://aaa.com/Storage1", the command generating unit 604 generates a first character string. The first character string is "<Uri>https://aaa.com/Storage1<Uri>". The command generating unit 604 refers to authentication information on "https://aaa.com/User1" stored in the storage 305 and generates a second character string based on this authentication information. The second character string is "<Password>dXNIcjE6cGFzc3dvcmQx</Password>". The command generating unit 604 uses the first character string and the second character string as elements in a "<Destination>" tag to generate a third character string. The third character string is "<Destination><Uri>https://aaa.com/Storage1</Uri><Password>dXNIcjE6cGFzc3dvcmQx</Password></Destination>".

After that, the command generating unit 604 sets the generated third character string and destination information on the communication terminal 102 as elements in the "<ScanJob>" tag and generates a message body part to which a character string of an XML declaration is added. It should be noted that the destination information on the communication terminal 102 is, for example, "<DestinationMyself><Uri>https://192.168.1.100/scan</Uri><UserName>Owner</UserName></Password>b3duZXI6cGFzc3dvcmQy</Password></Destination>". The character string of the XML declaration is, for example, "<?xml version="1.0" encoding="UTF-8"?>."

The command generating unit 604 then generates a message header part from the request URI "/scanJob" of the image forming apparatus 101, which is a destination, the IP address "192.168.1.100" of the communication terminal 102, and the number of characters "514" in the message body part. The message header part is "POST/scanJob HTTP/1.1" "Host:192.168.1.100" "Content-Type:text/xml" "Content-Type:text/xml" "Content-Length: 514". The command generating unit 604 generates a job command in FIG. 10, which will be described later, by joining the generated message header part and message body part.

Figure 8:
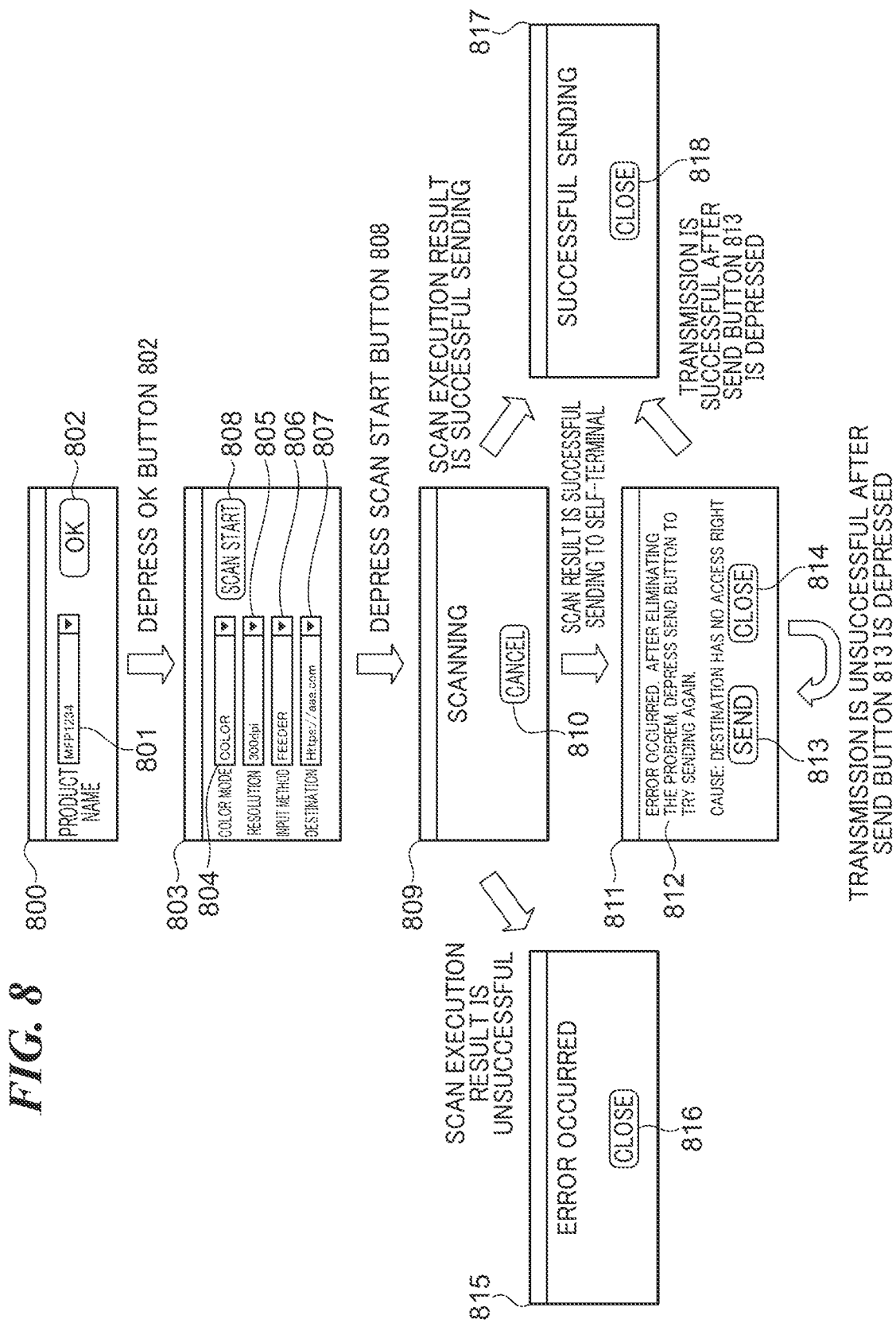
FIG. 8 is a view useful in explaining screen transitions in a scan app that is executed by the communication terminal in FIG. 1.

The display screen generating unit 605 generates various screens to be displayed on the display unit 310 of the communication terminal 102. For example, upon receiving a user's instruction to start the scan app 600, the display screen generating unit 605 generates a device selection screen 800 (FIG. 8 to be described later). When the user has depressed an OK button 802 (to be described later) on the device selection screen 800, the display screen generating unit 605 generates the scan setting screen 803 (to be described later).

The port control unit 606 carries out, in order that the communication terminal 102 can communicate using the POST method with other devices connected to the network 104, a process which opens a predetermined port on the communication terminal 102 and a process which closes the port to block external access when communication is unnecessary.

FIG. 7 is a block diagram schematically showing a functional arrangement of the storage service program 700 that is executed by the CPU 402 in FIG. 4. The storage service program 700 is stored in the storage 405 as described above. At startup of the cloud server 103, the CPU 402 develops the storage service program 700 on the RAM 403 and executes the same. Referring to FIG. 7, the storage service program 700 is comprised of a data sending and receiving unit 701, a data management unit 702, a command analysis unit 703, a command generating unit 704, and an authentication unit 705.

The data sending and receiving unit 701 is a module for the cloud server 103 to send and receive data to and from other devices on the network 104 using HTTP via the network I/F 406. For example, the cloud server 103 uses the data sending and receiving unit 701 to receive commands and image data from the image forming apparatus 101 and the communication terminal 102. The cloud server 103 also sends commands generated by the command generating unit 704 and image data stored in the storage 405 to destinations indicated by destination information stored in the data management unit 702. The data management unit 702 stores various data such as image data received by the data sending and receiving unit 701 and authentication information on the cloud server 103 in predetermined areas on the storage 405 and manages them.

The command analysis unit 703 analyzes commands received via the data sending and receiving unit 701 and carries out processes according to analysis results. A description will be given of an example of analysis performed by the command analysis unit 703 in a case where an image data sending command in FIG. 16, which will be described later, is received as response data when a job status is obtained. In this case, because a message header part is "POST/Storage 1 HTTP1/1", the command analysis unit 703 determines that a POST request has been received. The command analysis unit 703 also determines that an image file in PDF (Portable Document Format) has been received because a message header part is "Content-Type:application/pdf". The command analysis unit 703 stores data in a message body part as a PDF file in a storage area on the storage 405 corresponding to a request URI "Storage1".

The command generating unit 704 generates XML data that is to be sent to the image forming apparatus 101 and the communication terminal 102. A description will now be given of an example in which the command generating unit 704 generates data in a case where a user identified based on authentication information included in the image data sending command has no write permission. In this case, the command generating unit 704 generates a message body part by joining a character string indicating an error as a command result, a character string indicating that a reason for the error is "permission error", and a character string of an XML declaration together. It should be noted that the character string indicating the error is "<Result>Error</Result>". The character string indicating that the reason for the error is "permission error" is "<Reason>Permissions</Reason>". The character string of the XML declaration is "<?xml version="1.0" encoding="UTF-8"?>". The command generating unit 704 then generates a message header part including the number of characters in the message body part "88". The message header part is "HTTP/1.1-403 Forbidden" "Content-type:text/xml" "Content-Length:88". The command generating unit 704 then generates a send error response in FIG. 13 to be described later by joining the message header part and the message body part together.

The authentication unit 705 determines whether or not the authentication information received by the data sending and receiving unit 701 and the authentication information stored in the storage 405 match each other, and sends an authentication result to a sender of the data.

FIG. 8 is a view useful in explaining screen transitions in the scan app 600 that is executed by the communication terminal 102 in FIG. 1. After starting the scan app 600 in accordance with an instruction given by the user, the CPU 302 of the communication terminal 102 causes the display unit 310 to display the device selection screen 800 in FIG. 8 via the display unit I/F 308. The device selection screen 800 is a screen for making instructions from the communication terminal 102 to another device to execute a scan job. The device selection screen 800 includes a product name specification list box 801 and the OK button 802. On the product name specification list box 801, the user specifies a transmission destination of a job command for executing a scan job. In an example described below, it is assumed that the image forming apparatus 101 has been specified on the product name specification list box 801 by the user. When the user depresses the OK button 802, the CPU 302 of the communication terminal 102 stores information about the image forming apparatus 101, which is specified in the product name specification list box 801, on the RAM 303. The CPU 302 of the communication terminal 102 then causes the display unit 310 to display the scan setting screen 803 in FIG. 8 via the display unit I/F 308.

The scan setting screen 803 is a screen for setting setting values required to execute a scan job. The scan setting screen 803 includes the color mode specification list box 804, the resolution specification list box 805, the input method specification list box 806, a destination list box 807, and a scan start button 808. A color mode for use in executing the scan job is set in the color mode specification list box 804. A resolution of a scan image is set in the resolution specification list box 805. An image reading method such as "platen" or "ADF" is set in the input method specification list box 806. A transmission destination of the scan image is set in the destination list box 807. Here, the transmission destination of the scan image may be a storage present on the same network or a cloud storage such as Google Drive™ or OneDrive™.

When the user depresses the scan start button 808, the CPU 302 of the communication terminal 102 generates a job command based on scan settings made in the respective list boxes described above. The CPU 302 of the communication terminal 102 sends the generated job command to the image forming apparatus 101 specified in the product name specification list box 801. The CPU 302 of the communication terminal 102 then causes the display unit 310 to display a scanning-in-progress screen 809 in FIG. 8.

A message indicating that the scan job is in execution and a scan cancel button 810 are displayed on the scanning-in-progress screen 809. When the user depresses the scan cancel button 810, the CPU 302 of the communication terminal 102 sends a job cancellation command that gives an instruction to cancel a scan job to the image forming apparatus 101. While the scanning-in-progress screen 809 is being displayed on the display unit 310, the CPU 302 of the communication terminal 102 issues a status obtaining request to the image forming apparatus 101 at intervals of 100 msec to obtain information indicating a job status from the image forming apparatus 101. The CPU 302 of the communication terminal 102 switches screens on the display unit 310 based on the obtained information. For example, when a job execution result indicated by the obtained information is "successful sending to self-terminal" (which will be described later), the CPU 302 of the communication terminal 102 causes the display unit 310 to display a resend screen 811 in FIG. 8 via the display unit I/F 308. When a job execution result indicated by the obtained information is "unsuccessful", the CPU 302 of the communication terminal 102 causes the display unit 310 to display an error screen 815 in FIG. 8 via the display unit I/F 308. When a job execution result indicated by the obtained information is "successful sending", the CPU 302 of the communication terminal 102 causes the display unit 310 to display a transmission success screen 817 in FIG. 8 via the display unit I/F 308.

The resend screen 811 includes an error message 812, which indicates the details of an error in which the transmission (sending) of a scan image to a destination specified in the destination specification list box 807 is unsuccessful, a send button 813, and a close button 814. When the user depresses the send button 813, the CPU 302 of the communication terminal 102 sends a scan image received from the image forming apparatus 101 to a destination specified in the destination specification list box 807. When the transmission of the scan image is unsuccessful, the CPU 302 of the communication terminal 102 causes the display unit 310 to display the resend screen 811 with an updated error message via the display unit I/F 308. On the other hand, when the transmission of the scan image is successful, the CPU 302 of the communication terminal 102 causes the display unit 310 to display the transmission success screen 817 via the display unit I/F 308.

The error screen 815 includes a message indicating that an error has occurred and a close button 816. When the user depresses the close button 816, the CPU 302 of the communication terminal 102 exits the scan app 600. The transmission success screen 817 includes a message indicating that transmission is successful and a close button 818. When the user depresses the close button 818, the CPU 302 of the communication terminal 102 exits the scan app 600.

Figure 9:
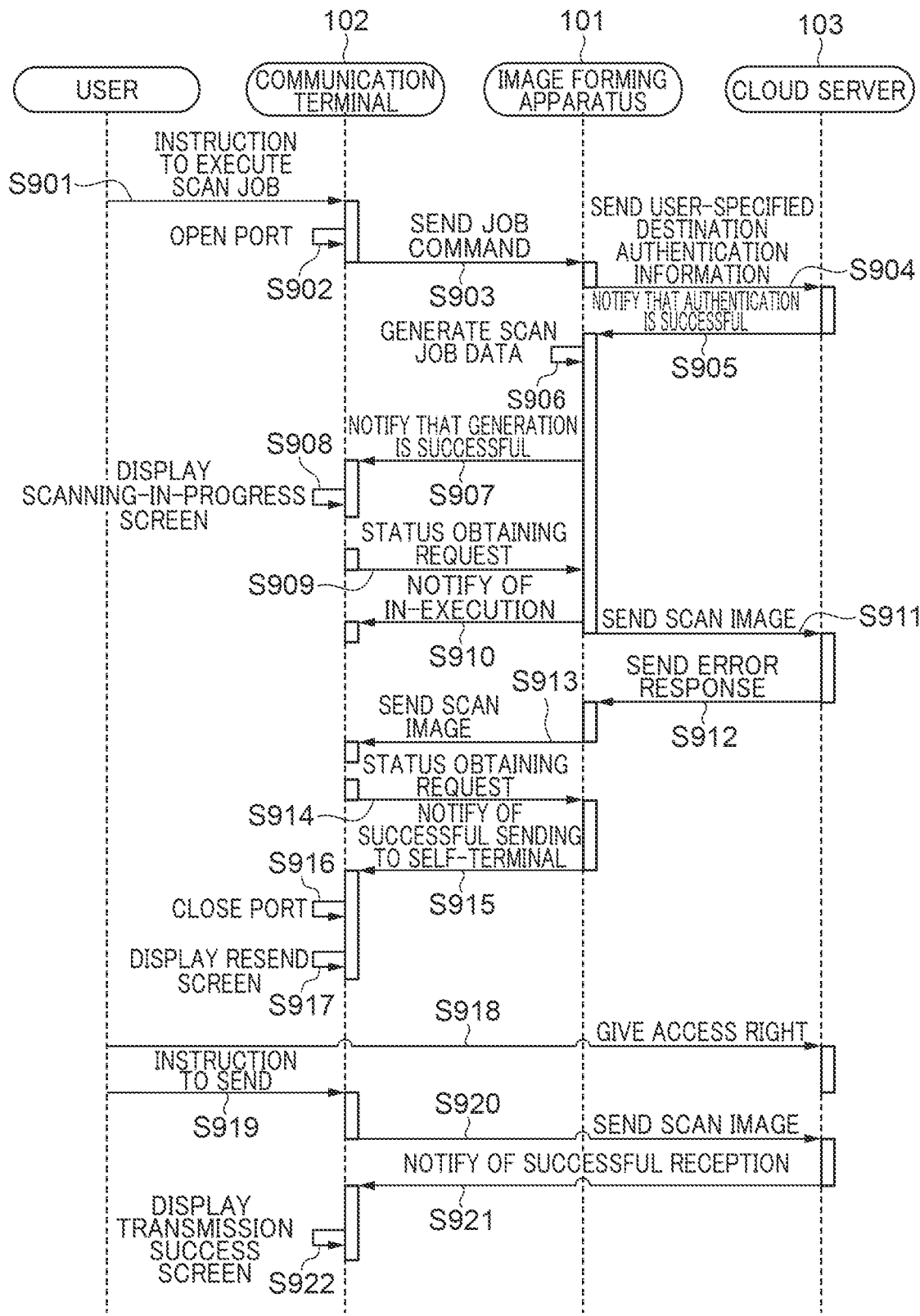
FIG. 9 is a sequence diagram useful in explaining a process that is carried out when the image forming apparatus in the image processing system in FIG. 1 is unsuccessful in sending a scan image.

FIG. 9 is a sequence diagram useful in explaining a process that is carried out when the image forming apparatus 100 in the image processing system 101 in FIG. 1 is unsuccessful in sending a scan image. FIG. 9 shows an example in which the image forming apparatus 101 is unsuccessful in sending a scan image from the image forming apparatus 101 to the cloud server 103 because a predetermined storage area in the cloud server 103 specified in the destination specification list box 807 is not given a write permission. It should be noted that the factor that the image forming apparatus 101 is unsuccessful in the transmission of a scan image is not limited to the above write permission error. For example, the factor that the image forming apparatus 101 is unsuccessful in the transmission of a scan image may be another factor such as an authentication error, which is caused by unsuccessful authentication by an apparatus at a transmission destination, destination error, server going down, file size error of the scan image, or storage capacity error at the transmission destination. Referring to FIG. 9, the communication terminal 102, the image forming apparatus 101, and the cloud server 103 carry out communications using HTTP, and the communication terminal 102 and the cloud server 103 perform authentication with Basic authentication.

Referring to FIG. 9, first, the user issues an instruction to execute a scan job (step S901). In the step S901, the user sets the image forming apparatus 101 in the product name specification list box 801 on the device selection screen 800 displayed on the display unit 310 of the communication terminal 102 and depresses the OK button 802. The user also sets values in the respective list boxes on the scan setting screen 803 displayed on the display unit 310 in response to the depression of the OK button 802 and then depresses the scan start button 808. In the following description, it is assumed that a predetermined storage area in the cloud server 103 as a transmission destination of a scan image has been set in the destination specification list box 807.

The CPU 302 of the communication terminal 102 that has received the instruction to execute the scan job from the user opens a predetermined port number in the communication terminal 102 such as "443" so that a POST request can be received with HTTPS (step S902). Then, the CPU 302 generates a job command shown in FIG. 10. The job command includes scan settings set in the step S901, destination information on the communication terminal 102, and destination information on a destination set in the destination specification list box 807 (hereafter referred to as a "user-specified destination") in the step S901.

The destination information on the communication terminal 102 is destination information required for the image forming apparatus 101 to send the scan image to the communication terminal 102 in step S913 (which will be described later). The destination information on the communication terminal 102 includes an image transmission destination URI of the communication terminal 102 and image transmission destination authentication information on the communication terminal 102. The image transmission destination URI of the communication terminal 102 is a URI that identifies a predetermined storage area in the communication terminal 102 and, for example, "https://192.168.1.100/scan".

The image transmission destination authentication information on the communication terminal 102 is a password used to perform authentication for allowing access to the communication terminal 102 and, for example, "b3duZWI6cGFzc3dvcmQy".

The destination information on the user-specified destination includes a URI of the user-specified destination and user-specified destination authentication information. The URI of the user-specified destination is a URI that identifies a destination set in the destination specification list box 807 in the step S901, and for example, "https://aaa.com/Storage1". The user-specified destination authentication information is a password used to perform authentication for allowing access to a user-specified destination, for example, "dXN1cjE6cGFzc3dvcmQx". The CPU 302 sends the generated job command to the image forming apparatus 101 (step S903) (command sending means).

Upon receiving the job command from the communication terminal 102, the CPU 202 of the image forming apparatus 101 sends the user-specified destination authentication information to the cloud server 103 corresponding to the URI of the user-specified destination in the job command (step S904). Specifically, the CPU 202 sends an HTTP GET request including the user-specified destination authentication information in the job command to the cloud server 103.

Upon receiving the HTTP GET request, the CPU 402 of the cloud server 103 causes the authentication unit 705 to perform authentication based on the user-specified destination authentication information included in the received HTTP GET request. When the authentication is successful, the CPU 402 notifies the image forming apparatus 101 to that effect (step S905). Specifically, the CPU 402 sends an HTTP response in which an HTTP response status code indicating that the authentication is successful is set to the image forming apparatus 101.

Based on the HTTP response status code set in the received HTTP response, the CPU 202 of the image forming apparatus 101 determines whether or not the authentication is successful. Upon determining that the authentication is successful, the CPU 202 generates scan job data for executing the scan job, based on the scan settings included in the job command received in the step S903 (step S906). When being successful in generation of the scan job data, the CPU 202 executes the scan job based on the scan job data. The CPU 202 notifies the communication terminal 102 of that the generation of the scan job data is successful (step S907). Specifically, the CPU 202 sends HTTP response data shown in FIG. 11 to the communication terminal 102. The HTTP response data includes an HTTP response data code which indicates that the generation of the scan job data is successful, and a status obtaining request URI to be used in step S909 (to be described later). The status obtaining request URI is a URI that identifies the image forming apparatus 101.

Upon receiving the HTTP response data from the image forming apparatus 101, the CPU 302 of the communication terminal 102 causes the display unit 310 to display the scanning-in-progress screen 809 (step S908). The CPU 302 also starts a status monitoring process for monitoring the status of the image forming apparatus 101 and issues a status obtaining request for a status of the image forming apparatus 101 (to obtain the status of the image forming apparatus 101) (step S909). Specifically, the CPU 302 of the communication terminal 102 sends an HTTP GET request, which is the status obtaining request for a status of the image forming apparatus 101, to the image forming apparatus 101 identified by the status obtaining request URI set in the received HTTP response data. In the status monitoring process, the CPU 302 issues the status obtaining request for a status of the image forming apparatus 101 at intervals of 100 msec.

Upon receiving the HTTP GET request, the CPU 202 of the image forming apparatus 101 notifies the communication terminal 102 of "in execution", which indicates that the scan image is being generated, as a job execution result (step S910). Specifically, the CPU 202 sends HTTP response data to the communication terminal 102. A message body part of the HTTP response data is comprised of status information on the scanner 213 which is held in the RAM 203, the number of pages that have been completely scanned in the scan job corresponding to a job ID specified in a query character string of the status obtaining request URI, and a job result indicating a job execution result. For example, when scanning of three originals among five originals to be scanned have been completed, the CPU 202 sends HTTP response data shown in FIG. 12A to the communication terminal 102. Based on a scanning state "<State>Scanning<State>" set in the HTTP response data, the CPU 202 of the image forming apparatus 101 is able to determine that the scan image is being generated in the image forming apparatus 101. When the generation of the scan image has been completed, the CPU 202 sends the scan image to the user-specified destination (step S911). Specifically, the CPU 202 sends an HTTPS POST request, which has an HTTP header with authentication information "dXNIcjE6cGFzc3dvcmQx" set in the job command added thereto and whose message body part is binary data of the scan image, to the cloud server 103.

Since a write permission for the user corresponding to the authentication information set in the HTTPS POST request is not given with respect to a predetermined storage area identified by the URI of the user-specified destination, the CPU 402 of the cloud server 103 carries out a process in step S912. In the step S912, the CPU 402 sends a send error response to the image forming apparatus 101. Specifically, the CPU 402 sends the send error response shown in FIG. 13 whose message body part is a message indicating "access permission error", to the image forming apparatus 101.

Upon receiving the send error response, the CPU 202 of the image forming apparatus 101 sends the scan image to the communication terminal 102 (step S913). Specifically, the CPU 202 of the image forming apparatus 101 sends an HTTPS POST request to the image transmission destination URI "https://192.168.1.100/scan" of the communication terminal 102 which is included in the job command. The HTTPS POST request is data that has an HTTP header to which the image transmission destination authentication information "b3duZWI6cGFzc3dvcmQy" on the communication terminal 102, which is included in the job command, is added and whose message body part is binary data of the scan image. Upon completing the transmission of the scan image to the communication terminal 102, the CPU 202 deletes the scan image from the storage 205. Thus, in the present embodiment, when the image forming apparatus 101 is unsuccessful in transmission of the scan image to the user-specified destination, the scan image is sent to the communication terminal 102, which is the sender of the job command, without being accumulated in the storage 205.

The CPU 302 of the communication terminal 102 issues a status obtaining request for a status of the image forming apparatus 101 (step S914). In the step S914, as with the step S909, the CPU 302 sends an HTTP GET request, which is a status obtaining request for a status of the image forming apparatus 101, to the image forming apparatus 101 identified by the status obtaining request URI.

Upon receiving the above-mentioned HTTP GET request after completing the transmission of the scan image to the communication terminal 102, the CPU 202 of the image forming apparatus 101 notifies of "successful sending to self-terminal" (job execution result notification) (which will be described later) as a job execution result (step S915). Specifically, the CPU 202 sends, to the communication terminal 102, HTTP response data shown in FIG. 12B in which a setting value that indicates "successful sending to self-terminal" as the job execution result is set.

Upon receiving the HTTP response data, the CPU 302 of the communication terminal 102 identifies a character string corresponding to the job execution result from the HTTP response data. Based on the identified character string "<JobResult>HostSendSuccess</JobResult>", the CPU 302 determines that the transmission of the scan image to the communication terminal 102 has been completed. Then, the CPU 302 closes the predetermined port number in the communication terminal 102, for example "443", which was opened in the step S902 (step S916). The CPU 302 of the communication terminal 102 then causes the display unit 310 to display the resend screen 811 (step S917).

After that, the user instructs the cloud server 103 to give a write permission for the user to the user-specified destination, via a Web browser or the like (step S918). The CPU 402 of the cloud server 103 gives the write permission for the user corresponding to the user-specified destination authentication information "b3duZWI6cGFzc3dvcmQy" to the user-specified destination. The user then instructs the communication terminal 102 to send the scan image (step S919). Specifically, the user depresses the send button 813 on the resend screen 811 displayed on the display unit 310 of the communication terminal 102.

The CPU 302 of the communication terminal 102 sends the scan image to the cloud server 103 (step S920). Specifically, the CPU 302 sends an image data sending command, which has an HTTP header with the user-specified destination authentication information "dXNIcjE6cGFzc3dvcmQx" added thereto and whose message body part is binary data of the scan image, to the cloud server 103.

Upon completing reception of the scan image, the CPU 402 of the cloud server 103 notifies the communication terminal 102 that the reception of the scan image is successful (step S922). Specifically, the CPU 402 sends an HTTP response, in which an HTTP response status code indicating that the reception of the scan image is successful is set, to the communication terminal 102.

Upon receiving the HTTP response, the CPU 302 of the communication terminal 102 determines that the transmission of the scan image is successful, based on the HTTP response status code set in the HTTP response. The CPU 302 of the communication terminal 102 causes the display unit 310 to display the transmission success screen 817 (step S922), and ends the present process.

Figure 14:
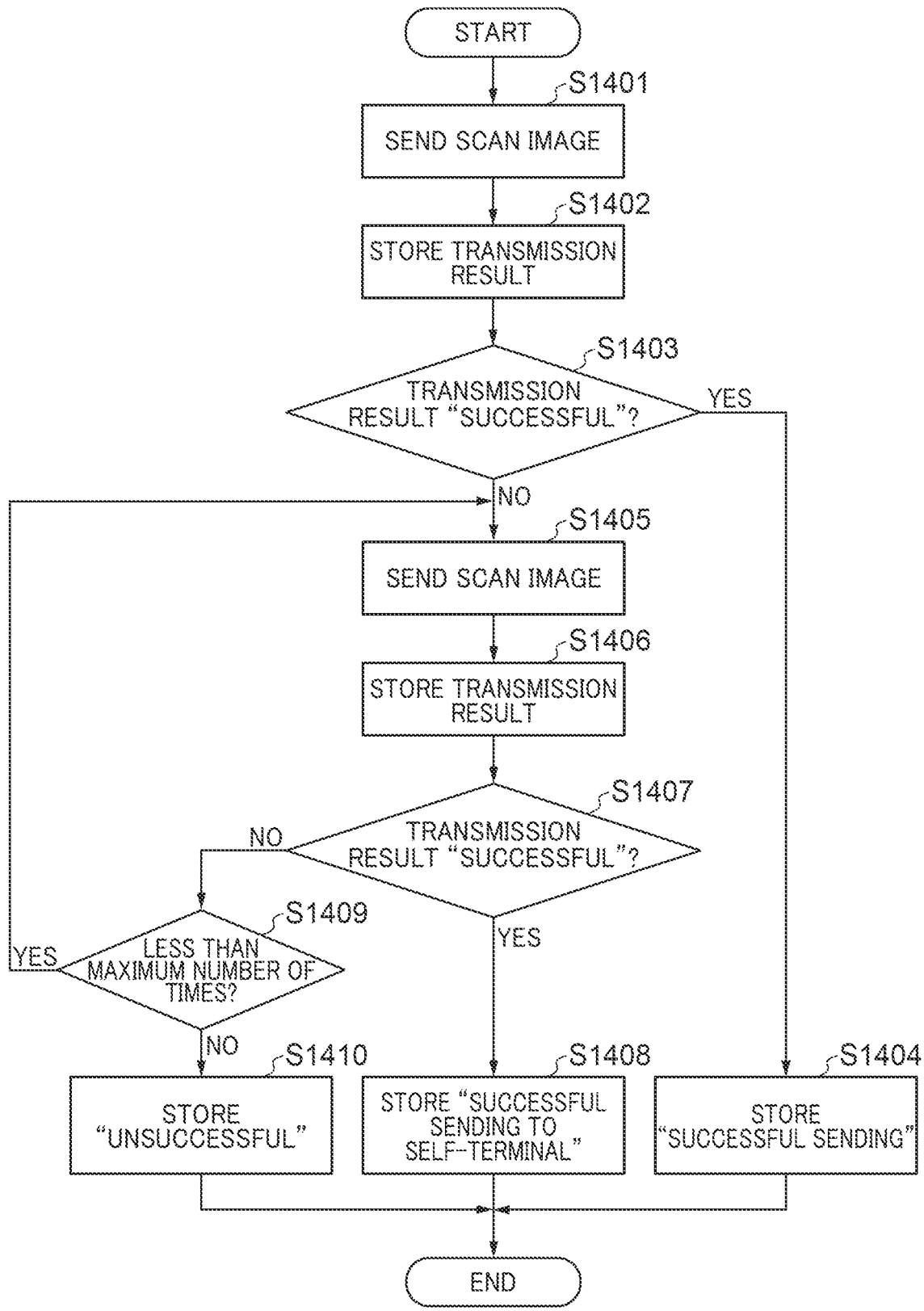
FIG. 14 is a flowchart showing the procedure of a job execution result storage process that is carried out by the image forming apparatus in FIG. 1.

FIG. 14 is a flowchart showing the procedure of a job execution result storage process that is carried out by the image forming apparatus 101 in FIG. 1. The job execution result storage process in FIG. 14 is implemented by the CPU 202 of the image forming apparatus 101 executing a program stored in the ROM 204 or the storage 205. The job execution result storage process in FIG. 14 is carried out after the scan image is generated by the scan job being executed based on the scan job data generated in the step S906 mentioned above. It is assumed that at the start of the job execution result storage process, the scan image, the destination information on the communication terminal 102, and the destination information on the user-specified destination are stored in the RAM 203. It is also assumed that the maximum number of times the transmission of the scan image is retried, for example, "5", and the number of retries have been stored in the RAM 203, in the image forming apparatus 101. It should be noted that the number of retries is reset to "0" at the start of a next job.

Referring to FIG. 14, the CPU 202 sends the scan image to the cloud server 103 corresponding to the user-specified destination (step S1401). Specifically, as with the step S911 described above, the CPU 202 sends an HTTPS POP request to the cloud server 103. Then, the CPU 202 obtains an HTTPS response to the POST request from the cloud server 103 and stores a transmission result included in the HTTPS response into the RAM 203 (step S1402). After that, the CPU 202 determines whether or not the transmission result stored in the RAM 203 in the step S1402 is "successful" (step S1403).

As a result of the determination in the step S1403, when the transmission result stored into the RAM 203 in the step S1402 is "successful", the CPU 202 stores "successful sending" as a job execution result in the RAM 203 (step S1404) and ends the present process.

As a result of the determination in the step S1403, in a case where the transmission result stored into the RAM 203 in the step S1402 is not "successful", the CPU 202 sends the scan image to the communication terminal 102 (step S1405). Specifically, as with the step S913 described above, the CPU 202 sends an HTTPS POP request to the communication terminal 102. Then, the CPU 202 obtains an HTTPS response to the POST request, from the communication terminal 102, and stores a transmission result included in the HTTPS response into the RAM 203 (step S1406). After that, the CPU 202 determines whether or not the transmission result stored into the RAM 203 in the step S1406 is "successful" (step S1407).

As a result of the determination in the step S1407, in a case where the transmission result is "successful", the CPU 202 stores "successful sending to self-terminal" as a job execution result in the RAM 203 (step S1408). The job execution result "successful sending to self-terminal" indicates that the transmission of the scan image to the sender of the job command, not the transmission to the user-specified destination, has been completed. After that, the job execution result storage process is ended.

As a result of the determination in the step S1407, when the transmission result is not "successful", the CPU 202 determines whether or not the number of retries stored in the RAM 203 is less than the maximum number of retries (step S1409).

As a result of the determination in the step S1409, in a case where the number of retries stored in the RAM 203 is less than the maximum number of retries, the job execution result storage process returns to the step S1405. As a result of the determination in the step S1409, in a case where the number of retries stored in the RAM 203 is not less than the maximum number of retries (that is, the maximum number of retries has been reached), the CPU 202 stores "unsuccessful" as a job execution result in the RAM 203 (step S1410) and ends the present process. After that, upon receiving a status obtaining request from the communication terminal 102, the CPU 202 sends HTTP response data including the job execution result stored in the RAM 203 to the communication terminal 102.

Figure 15:
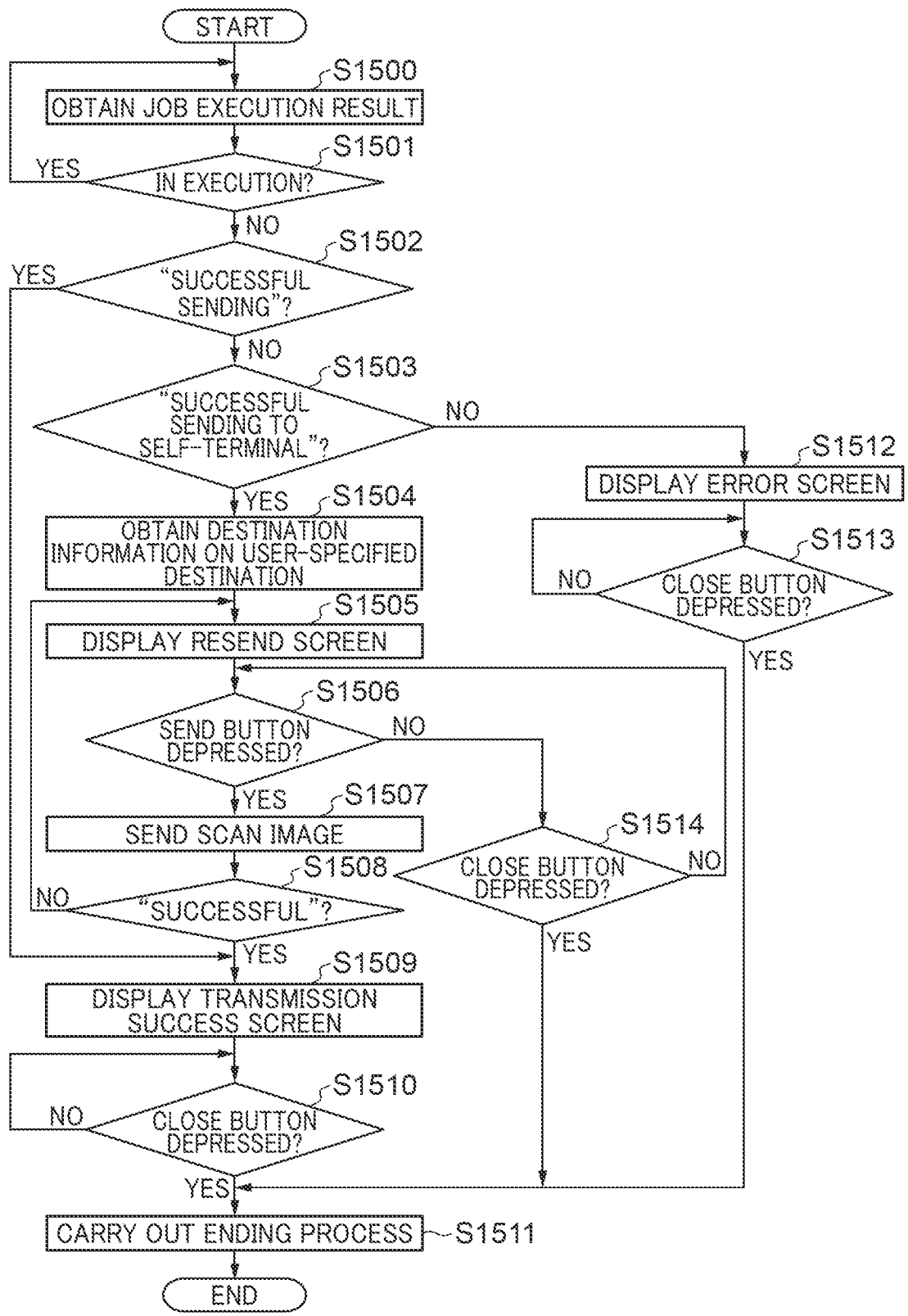
FIG. 15 is a flowchart showing the procedure of a communication terminal post-process that is carried out by the communication terminal in FIG. 1.

FIG. 15 is a flowchart showing the procedure of a communication terminal post-process that is carried out by the communication terminal 102 in FIG. 1. The communication terminal post-process in FIG. 15 is implemented by the CPU 302 of the communication terminal 102 executing a program stored in the ROM 304 or the storage 305. The communication terminal post-process in FIG. 15 is carried out when the communication terminal 102 starts the status monitoring process. At the start of the communication terminal post-process, the status obtaining request URI and the destination information on the user-specified destination is stored into the RAM 303, and also, the scan image sent from the image forming apparatus 101 in the job execution result storage process described above is stored in the storage 305.

Referring to FIG. 15, first, the CPU 302 obtains the job execution result included in the HTTP response data sent from the image forming apparatus 101 (step S1500). Next, the CPU 302 determines whether or not the obtained execution result is "in execution" (step S1501).

As a result of the determination in the step S1501, in a case where the obtained execution result is "in execution", the communication terminal post-process returns to the step S1500. As a result of the determination in the step S1501, in a case where the obtained execution result is not "in execution", the CPU 302 determines whether or not the obtained execution result is "successful sending" (step S1502).

As a result of the determination in the step S1502, in a case where the obtained execution result is "successful sending", the communication terminal post-process proceeds to step S1509, which will be described later. As a result of the determination in the step S1502, in a case where the obtained execution result is not "successful sending", the CPU 302 determines whether or not the obtained execution result is "successful sending to self-terminal" (step S1503).

As a result of the determination in the step S1503, in a case where the obtained execution result included in the HTTP response data is "successful sending to self-terminal", the CPU 302 obtains the destination information on the user-specified destination from the RAM 303 (step S1504). Then, the CPU 302 causes the display unit 310 to display the resend screen 811 via the display unit I/F 308 (step S1505). After that, the CPU 302 determines whether or not the user has depressed the send button 813 on the resend screen 811 (step S1506).

When the result of the determination in the step S1506 is positive (YES), that is, the user has depressed the send button 813 on the resend screen 811, the CPU 302 sends the image data to the cloud server 103 via the network I/F 306 (step S1507). Specifically, the CPU 302 sends the image data sending command shown in FIG. 16, which has the HTTP header with the user-specified destination authentication information "dXNIcjE6cGFzc3dvcmQx" added thereto and whose message body part is binary data of the scan image, to the cloud server 103. The CPU 302 obtains a transmission response to the transmission in the step S1507 from the cloud server 103. The CPU 302 determines whether or not a transmission result included in the received transmission response is "successful" indicating the transmission of the image data is successful (step S1508).

As a result of the determination in the step S1508, in a case where the transmission result included in the transmission response is not "successful", the communication terminal post-process returns to the step S1505. As a result of the determination in the step S1508, in a case where the transmission result included in the transmission response is "successful", the CPU 302 causes the display unit 310 to display the transmission success screen 817 via the display unit I/F 308 (step S1509). The CPU 302 then stands by until the user depresses the close button 818 on the transmission success screen 817. When the user depresses the close button 818 on the transmission success screen 817 (YES in step S1510), the CPU 302 carries out an ending process (step S1511). In the ending process, the CPU 302 deletes the destination information on the user-specified destination from the RAM 303. In the ending process, the CPU 302 deletes the scan image from the storage 305 in a case where the scan image obtained from the image forming apparatus 101 is present in the storage 305. After that, the communication terminal post-process is ended.

As a result of the determination in the step S1503, in a case where the obtained job execution result is not "successful sending to self-terminal", the CPU 302 causes the display unit 310 to display the error screen 815 via the display unit I/F 308 (step S1512). The CPU 302 stands by until the user depresses the close button 816 on the error screen 815. When the user depresses the close button 816 on the error screen 815 (YES in step S1513), the communication terminal post-process proceeds to the step S1511.

In a case where the result of the determination in the step S1506 is negative (NO), that is, the user has not depressed the send button 813 on the resend screen 811, the CPU 302 determines whether or not the user has depressed the close button 814 on the resend screen 811 (step S1514).

In a case where the result of the determination in the step S1514 is negative (NO), that is, the user has not depressed the close button 814 on the resend screen 811, the communication terminal post-process returns to the step S1506. In a case where the result of the determination in the step S1514 is positive (YES), that is, the user has depressed the close button 814 on the resend screen 811, the communication terminal post-process proceeds to the step S1511.

According to the first embodiment described above, in a case where the image forming apparatus 101 is unsuccessful in the transmission of the scan image to the user-specified destination, the image forming apparatus 101 sends the said scan image to the communication terminal 102. In accordance with a user's instruction to send the scan image, the communication terminal 102 sends the scan image received from the image forming apparatus 101 to the user-specified destination. This makes it possible to retry the transmission of the scan image from the communication terminal 102 without the scan image being accumulated in the storage 205 of the image forming apparatus 101. As a result, the transmission of the scan image can be retried without the execution of other jobs in the image forming apparatus 101 being restricted.

Moreover, in the first embodiment described above, the job command includes the destination information on the user-specified destination and the destination information on the communication terminal 102. Therefore, if the image forming apparatus 101 is unsuccessful in the transmission of the scan image to the user-specified destination, the image forming apparatus 101 can easily send the scan image to the communication terminal 102, which is the sender of the job command.

In the first embodiment described above, in response to the reception of the HTTP response data including "successful sending to self-terminal" from the image forming apparatus 101 after receiving the scan image from the image forming apparatus 101, the communication terminal 102 causes the display unit 310 to display the resend screen 811. As a result, the instruction to send the scan image can be received from the user in a state in which preparations for retrying the transmission of the scan image from the communication terminal 102 have been made. As a result, after receiving the instruction to send the scan image from the user, the communication terminal 102 can send the scan image to the user-specified destination without delay.

Moreover, in the first embodiment described above, the details of the error in which the image forming apparatus 101 is unsuccessful in the transmission of the scan image to the user-specified destination is displayed on the resend screen 811. This makes it possible to inform the user of the reason why it is necessary to retry the transmission of the scan image.

In the first embodiment described above, "successful sending to self-terminal" is different from "successful sending" indicating that the transmission of the scan image to the user-specified destination has been completed. Thus, the communication terminal 102 can easily perform control as to whether or not to display the resend screen 811.

Next, a description will be now given of an image processing system and a control method therefor according to a second embodiment of the present invention. The second embodiment is basically the same as the first embodiment described above in terms of its functions and operations, and is different from the above-mentioned first embodiment in that the control over the transmission of a scan image varies according to whether or not the image forming apparatus 101 has a spooling capability. Features of the configurations and operations that are the same as in the first embodiment will thus not be described, only features that are different from those of the first embodiment being described below. It should be noted that in the present embodiment, an image forming apparatus, in which when all scan images generated by a scan job are stored in the storage 205, execution of other jobs is restricted, is defined as an image forming apparatus with no spooling capability. The image forming apparatus with no spooling capability is, for example, an image forming apparatus equipped with the storage 205 having such a small storage capacity that it cannot store all scan images generated by a scan job. On the other hand, an image forming apparatus, in which even if all scan images generated by a scan job are stored in the storage 205, execution of other jobs is not restricted, is defined as an image forming apparatus with the spooling capability. The image forming apparatus with the spooling capability is, for example, an image forming apparatus equipped with the storage 205 having such a large storage capacity that it can store further data in addition to all scan images generated by a scan job.

Figure 17:
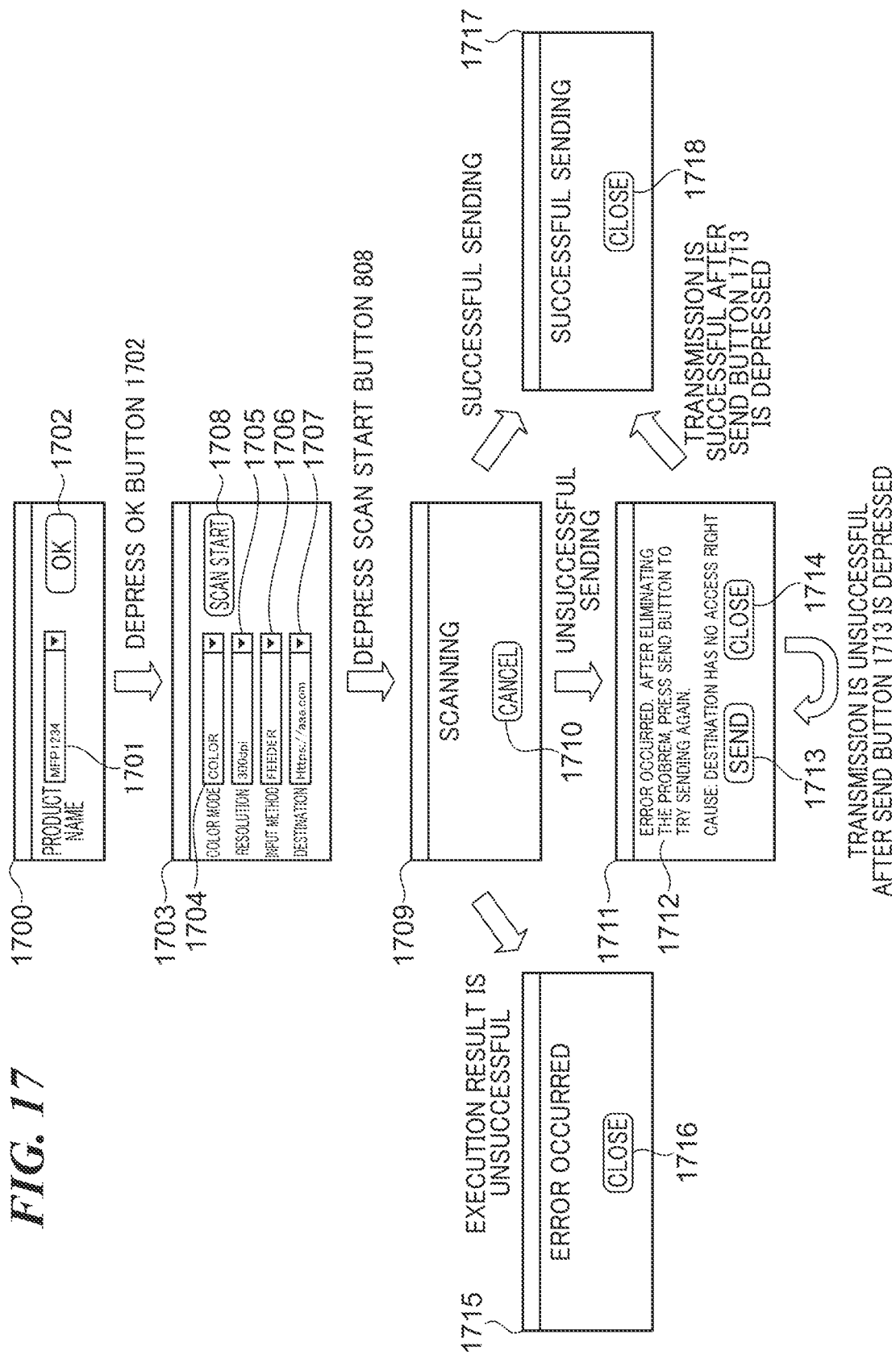
FIG. 17 is a view useful in explaining screen transitions in a scan app that is executed by the communication terminal in FIG. 1 in a second embodiment.

FIG. 17 is a view useful in explaining screen transitions in the scan app 600 that is executed by a communication terminal 102 in FIG. 1 according to the second embodiment. After starting the scan app 600 in accordance with an instruction given by the user, the CPU 302 of the communication terminal 102 causes the display unit 310 to display a device selection screen 1700 in FIG. 17 via the display I/F 308. Functions and configurations of the device selection screen 1700 are the same as those of the device selection screen 800. It should be noted that in an example described below, it is assumed that the image forming apparatus 101 has been specified on the product name specification list box 1701 on the device selection screen 1700 by the user. Next, when the user depresses an OK button 1702 on the device selection screen 1700, the CPU 302 stores information about the image forming apparatus 101, which has been selected in the product name specification list box 1701, on the RAM 303. Then, the CPU 302 causes the display unit 310 to display a scan setting screen 1703 in FIG. 17 via the display I/F 308. Functions and configurations of the scan setting screen 1703 are the same as those of the scan setting screen 803. When the user depresses a scan start button 1708 on the scan setting screen 1703, the CPU 302 generates a job command based on scan settings configured in respective list boxes on the scan setting screen 1703. The CPU 302 sends the generated job command to the image forming apparatus 101 specified in the product name specification list box 1701. The CPU 302 then causes the display unit 310 to display a scanning-in-progress screen 1709 in FIG. 17. Functions and configurations of the scanning-in-progress screen 1709 are the same as those of the scanning-in-progress screen 809.

When the user depresses a scan cancellation button 1710 on the scanning-in-progress screen 1709, the CPU 302 sends a job cancellation command to the image forming apparatus 101. While the scanning-in-progress screen 1709 is being displayed, the CPU 302 issues a status obtaining request to the image forming apparatus 101 at intervals of 100 msec to obtain information indicating a job status from the image forming apparatus 101. The CPU 302 switches screens on the display unit 310 based on the obtained information. For example, when the obtained information is "unsuccessful", the CPU 302 causes the display unit 310 to display an error screen 1715 in FIG. 17 via the display I/F 308. Functions and configurations of the error screen 1715 are the same as those of the error screen 815. In the present embodiment, when the image forming apparatus 101 has "no spooling capability", the communication terminal 102 obtains a scan image from the image forming apparatus 101 and sends the said scan image to a user-specified destination. When the transmission of the scan image from the communication terminal 102 to the cloud server 103 is unsuccessful, the CPU 302 causes the display unit 310 to display a resend screen 1711 in FIG. 17 via the display I/F 308. Functions and configurations of the resend screen 1711 are the same as those of the resend screen 811. In a case where the obtained information is "successful sending" or in a case where the transmission of the scan image from the communication terminal 102 to the cloud server 103 is successful, the CPU 302 causes the display unit 310 to display a transmission success screen 1717 in FIG. 17 via the display I/F 308. Functions and configurations of the transmission success screen 1717 are the same as those of the transmission success screen 817.

Figure 18:
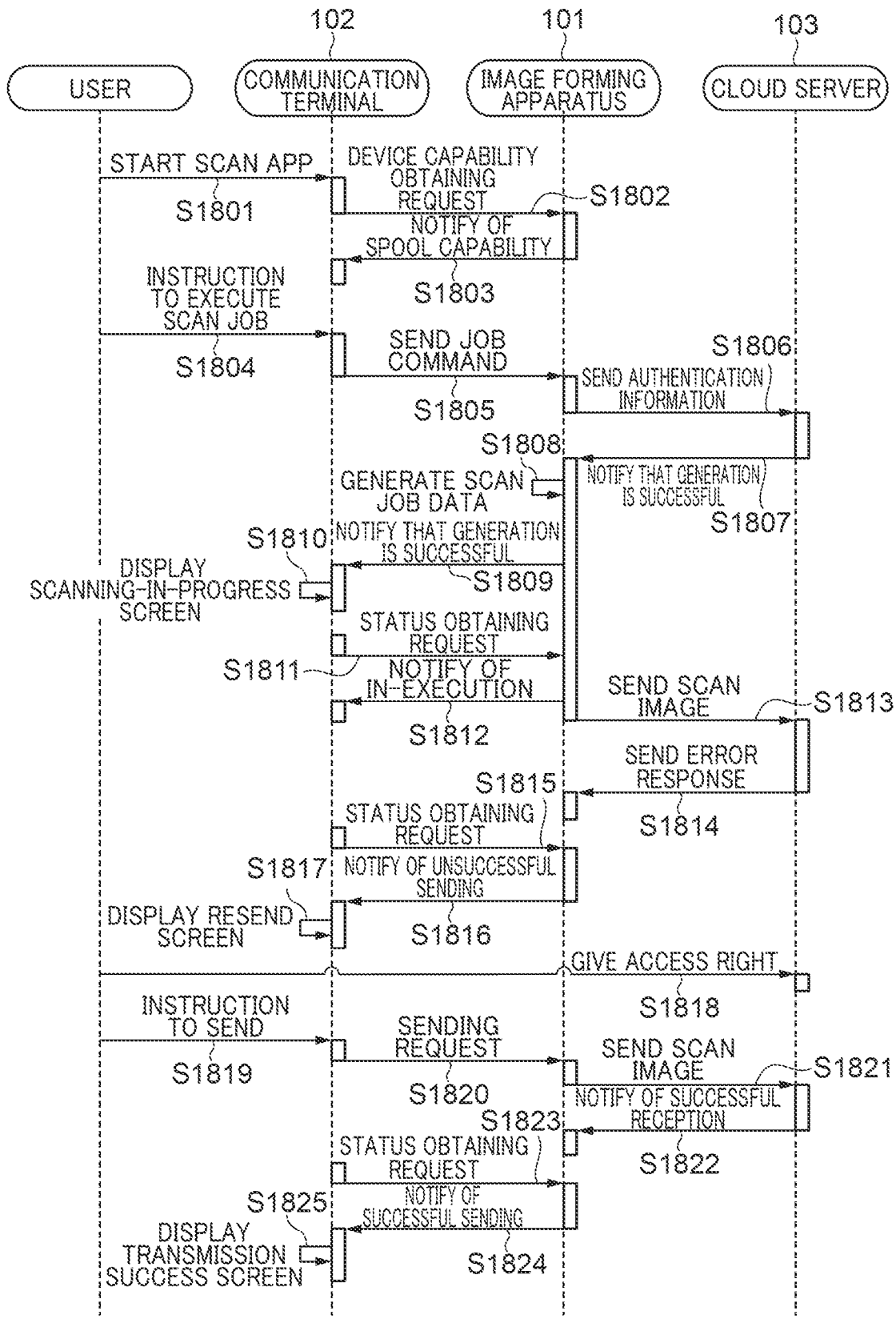
FIG. 18 is a sequence diagram useful in explaining a process that is carried out when an image forming apparatus having a spooling capability is unsuccessful in sending a scan image in the second embodiment.

FIG. 18 is a sequence diagram useful in explaining a process that is carried out when the image forming apparatus 101 having a spooling capability is unsuccessful in sending a scan image in the second embodiment. FIG. 18 shows an example in which the image forming apparatus 101 is unsuccessful in sending a scan image from the image forming apparatus 101 to the cloud server 103 because a predetermined storage area in the cloud server 103 specified in the destination specification list box 1707 is not given a write permission. It should be noted that referring to FIG. 18, the communication terminal 102, the image forming apparatus 101, and the cloud server 103 perform communication using HTTP, and the communication terminal 102 and the cloud server 103 perform authentication using Basic authentication.

Referring to FIG. 18, first, the user starts the scan app 600 in the communication terminal 102 (step S1801). The CPU 302 of the communication terminal 102 makes a device capability obtaining request to the image forming apparatus 101 connected to the network 104 (step S1802). In the step S1802, the CPU 302 sends an HTTP GET request to the image forming apparatus 101 via the network 104 using a capability obtaining URI for making the device capability obtaining request. The capability obtaining URI is, for example, "http://192.168.1.100/getDeviceCap".

Upon receiving the HTTP GET request, the CPU 202 of the image forming apparatus 101 notifies the communication terminal 102 of whether or not the image forming apparatus 101 has the spooling capability (here, "has spooling capability") (step S1803). Specifically, the CPU 202 sends a device capability response shown in FIG. 19A, which includes "<Spool>True</SpoolCap>" indicating that the image forming apparatus 101 has the spooling capability, to the communication terminal 102. The CPU 302 of the communication terminal 102 determines that the image forming apparatus 101 "has spooling capability" based on "<Spool>True>/SpoolCap>" included in the received device capability response. The CPU 302 stores "True" as a spooling capability setting value for the image forming apparatus 101 in the RAM 303.

After that, as with the step S901, the user operates the communication terminal 102 to issue an instruction to execute a scan job (step S1804). The CPU 302 of the communication terminal 102 generates a job command shown in FIG. 20A including scan settings configured in the step S1804 and destination information on a user-specified destination set in the step S1804. The CPU 302 then sends the generated job command to the image forming apparatus 101 (step S1805). Namely, the job command sent in the step S1805 does not include the destination information on the communication terminal 102, which is the sender of the job command, as distinct from the job command sent in the step S903 in FIG. 9 in the first embodiment.

Upon receiving the job command from the communication terminal 102, the CPU 202 of the image forming apparatus 101 sends user-specified destination authentication information to the cloud server 103 as with the step S904 (step S1806).

The CPU 402 of the cloud server 103 causes the authentication unit 705 to perform authentication based on the received user-specified destination authentication information. When the authentication is successful, the CPU 402 notifies the image forming apparatus 101 of that the authentication is successful as with the step S905 (step S1807).

Based on this notification, the CPU 202 of the image forming apparatus 101 determines whether or not the authentication is successful. Upon determining that the authentication is successful, the CPU 202 generates scan job data based on the scan settings, which are included in the job command received in the step S1806, as with the step S906 (step S1808). After generation of the scan job data is successful, the CPU 202 executes the scan job based on the scan job data. The CPU 202 also notifies the communication terminal 102 of that the generation of the scan job data is successful, as with the step S907 (step S1809).

Upon receiving this notification, the CPU 302 of the communication terminal 102 causes the display unit 310 to display the scanning-in-progress screen 1709, as with the step S908 (step S1810). The CPU 302 also starts a status monitoring process for monitoring the status of the image forming apparatus 101 at intervals of 100 msec, and as with the step S909, makes a status obtaining request for a status of the image forming apparatus 101 (step S1811).

In a case where the generation of a scan image has not been completed when the status obtaining request is received from the communication terminal 102, the CPU 202 of the image forming apparatus 101 notifies the communication terminal 102 of "in execution" as with the step S910 (step S1812). When the generation of the scan image is completed, the CPU 202 sends the scan image to the cloud server 103, which is the user-specified destination, as with the step S911 (step S1813).

Since a write permission for the user is not given with respect to a predetermined storage area identified by the URI of the user-specified destination, the CPU 402 of the cloud server 103 sends a send error response to the image forming apparatus 101, as with the step S912 (step S1814). In the second embodiment, when the image forming apparatus 101 has the spooling capability, a process corresponding to the step S913 in FIG. 9 in the first embodiment is not carried out. Namely, in the second embodiment, the image forming apparatus 101 that has received the send error response does not send the scan image to the communication terminal 102.

On the other hand, the CPU 302 of the communication terminal 102 issues a status obtaining request for a status of the image forming apparatus 101 to the image forming apparatus 101 as with the step S914 (step S1815).

Upon receiving the status obtaining request from the communication terminal 102 after receiving the send error response from the cloud server 103, the CPU 202 of the image forming apparatus 101 notifies the communication terminal 102 of that the transmission of the scan image to the user-specified destination is unsuccessful (step S1816). Specifically, the CPU 202 sends HTTP response data shown in FIG. 12C, which includes a job execution result indicating the details of the send error response about the transmission of the scan image from the image forming apparatus 101 to the cloud server 103, to the communication terminal 102.

Based on a job result <JobResult>SendError</JobResult>" included in the received HTTP response data, the CPU 302 of the communication terminal 102 determines that the transmission of the scan image to the cloud server 103 is unsuccessful. Based on this determination, the CPU 302 causes the display unit 310 to display the resend screen 1711 (step S1817).

After that, the user instructs the cloud server 103 to give a write permission for the user to the user-specified destination, via a Web browser or the like, as with the step S918 (step S1818). Then, the user instructs the communication terminal 102 to send the scan image, as with the step S919 (step S1819).

Upon receiving the instruction to send the scan image, from the user, the CPU 302 of the communication terminal 102 issues a sending request for the scan image to the image forming apparatus 101 via the network I/F 306 (step S1820).

As with the step S1813, the CPU 202 of the image forming apparatus 101 sends the scan image to the cloud server 103, which is the user-specified destination (step S1821).

Upon completing the reception of the scan image, the CPU 402 of the cloud server 103 notifies the image forming apparatus 101 that the reception of the scan image is successful (step S1822). Specifically, the CPU 402 sends an HTTP response, in which an HTTP response status code indicating that the reception of the scan image is successful is set, to the image forming apparatus 101.

On the other hand, the CPU 302 of the communication terminal 102 issues a status obtaining request for a status of the image forming apparatus 101, to the image forming apparatus 101, as with the step S1815 (step S1823).

Upon receiving the status obtaining request from the communication terminal 102 after being notified by the cloud server 103 of that the reception of the scan image is successful, the CPU 202 of the image forming apparatus 101 notifies the communication terminal 102 of that the transmission of the scan image is successful (step S1824). Specifically, the CPU 202 sends HTTP response data shown in FIG. 12D, which includes an HTTP response status code indicating that the transmission of the scan image to the user-specified destination is successful, to the communication terminal 102.

Based on the HTTP response status code set in the received HTTP response data, the CPU 302 of the communication terminal 102 determines that the transmission of the scan image to the user-specified destination is successful. Based on this determination, the CPU 302 of the communication terminal 102 causes the display unit 310 to display the transmission success screen 1717 (step S1825), and ends the present process.

FIG. 21 is a sequence diagram useful in explaining a process that is carried out when the image forming apparatus 101 having no spooling capability is unsuccessful in sending a scan image in the second embodiment. FIG. 21 shows an example in which the image forming apparatus 101 is unsuccessful in sending a scan image from the image forming apparatus 101 to the cloud server 103 because a predetermined storage area in the cloud server 103 specified in the destination specification list box 1707 is not given a write permission. Referring to FIG. 21, likewise, the communication terminal 102, the image forming apparatus 101, and the cloud server 103 perform communication using HTTP, and the communication terminal 102 and the cloud server 103 perform authentication using Basic authentication. It should be noted that the process in FIG. 21 is similar to the process in FIG. 18 described above, and a description will now be given particularly of processing different from those in the process in FIG. 18.

Referring to FIG. 21, steps S2101 and S2102 which are the same as the steps S1801 and S1802 described above are executed. Then, upon receiving the HTTP GET request from the communication terminal 102, the CPU 202 of the image forming apparatus 101 notifies the communication terminal 102 of whether or not the image forming apparatus 101 has the spooling capability (here, "no spooling capability") (step S2103). Specifically, the CPU 202 sends a device capability response shown in FIG. 19B, which includes "<Spool>False</SpoolCap>" indicating that the image forming apparatus 101 has no spooling capability, to the communication terminal 102. The CPU 302 of the communication terminal 102 determines that the image forming apparatus 101 does not have the spooling capability, that is, has "no spooling capability" based on "<Spool>False</SpoolCap>" included in the received device capability response. The CPU 302 stores "False" as a spooling capability setting value for the image forming apparatus 101 in the RAM 303.

After that, as with the step S1804, the user operates the communication terminal 102 to issue an instruction to execute a scan job (step S2104). The CPU 302 of the communication terminal 102 sends user-specified destination authentication information to the cloud server 103, which is a user-specified destination set in the step S2104 (step S2105). Specifically, the CPU 302 obtains the user-specified destination authentication information from the storage 305 and sends an HTTP GET request including the said user-specified destination authentication information to the cloud server 103.

Upon receiving the HTTP GET request, the CPU 402 of the cloud server 103 performs authentication via the authentication unit 705 based on the user-specified destination authentication information included in the received HTTP GET request. When the authentication is successful, the CPU 402 notifies the communication terminal 102 of that effect (step S2106). Specifically, the CPU 402 sends an HTTP response, in which an HTTP response code indicating that the authentication is successful is set, to the communication terminal 102.

Upon receiving the HTTP response, the CPU 302 of the communication terminal 102 opens a predetermined port number in the communication terminal 102, for example "443", so that a POST request can be received with HTTPS (step S2107). Then, the CPU 302 of the communication terminal 102 generates a job command in FIG. 20B. This job command includes scan settings made by the user in the step S2104, and destination information on the communication terminal 102. The destination information on the communication terminal 102 includes "https://192.168.1.100/scan", which is an image transmission destination URI of the communication terminal 102, and "b3duZWI6cGFzc3dvcmQy", which is image transmission destination authentication information on the communication terminal 102. Thus, in the second embodiment, when the image forming apparatus 101 has "no spooling capability", no user-specified destination authentication information is set in the job command, but the destination information on the communication terminal 102, which is the sender of the job command, is set in the job command. Then, the CPU 302 sends the generated job command to the image forming apparatus 101 (step S2108).

Based on the scan settings included in the received job command, the CPU 202 of the image forming apparatus 101 generates scan job data (step S2109). Upon completing the generation of the scan job data, the CPU 202 executes the scan job based on the scan job data. As with the step S1809, the CPU 202 also notifies the communication terminal 102 of that the generation of the scan job data is successful (step S2110).

Upon receiving this notification from the image forming apparatus 101, the CPU 302 of the communication terminal 102 causes the display unit 310 to display the scanning-in-progress screen 1709, as with the step S1810 (step S2111). The CPU 302 also starts a status monitoring process for monitoring the status of the image forming apparatus 101 at intervals of 100 msec, and as with the step S1811, issues a status obtaining request for a status of the image forming apparatus 101 to the image forming apparatus 101 (step S2112).

In a case where the generation of a scan image has not been completed when the status obtaining request is received from the communication terminal 102, the CPU 202 of the image forming apparatus 101 notifies the communication terminal 102 of "in execution" as with the step S1812 (step S2113). When the generation of the scan image has been completed, the CPU 202 sends the scan image to the communication terminal 102, which is the sender of the job command (step S2114). Thus, in the second embodiment, the image forming apparatus 101 with no spooling capability sends the scan image to the communication terminal 102, which is the sender of the job command, not to the cloud server 103.

On the other hand, the CPU 302 of the communication terminal 102 issues a status obtaining request for a status of the image forming apparatus 101, to the image forming apparatus 101, as with the step S2112 (step S2115).

Upon receiving the status obtaining request after completing the transmission of the scan image to the communication terminal 102, the CPU 202 of the image forming apparatus 101 notifies the communication terminal 102 of that the transmission of the scan image has been completed (step S2116).

Upon receiving this notification from the image forming apparatus 101, the CPU 302 of the communication terminal 102 closes the predetermined port number in the communication terminal 102, "443" which was opened in the step S2107, for example (step S2117). Then, the CPU 302 sends the scan image sent from the image forming apparatus 101 in the step S2114, to the cloud server 103, which is the user-specified destination (step S2118). Specifically, the CPU 302 sends an HTTPS POST request, which has an HTTP header to which the authentication information "dXlNlcjE6cGFzc3dvcmQx" set in the above-mentioned job command is added and whose message body part is binary data of the scan image, to the cloud server 103.

The CPU 402 of the cloud server 103 sends a send error response to the communication terminal 102 because the predetermined storage area is not given a write permission for the user corresponding to the authentication information set in the above-mentioned HTTPS POST request (step S2119).

Upon receiving the send error response, the CPU 302 of the communication terminal 102 causes the display unit 310 to display the resend screen 1711 via the display unit I/F 308 (step S21210).

After that, the user instructs the cloud server 103 to give a write permission for the user to the user-specified destination, via a Web browser or the like, as with the step S1818 (step S2121). Then, the user instructs the communication terminal 102 to send the scan image, as with the step S1819 (step S2122).

Upon receiving the instruction to send the scan image, from the user, the CPU 302 of the communication terminal 102 sends the scan image to the cloud server 103, which is the user-specified destination, as with the step S2118 (step S2123).

Upon completing the reception of the scan image, the CPU 402 of the cloud server 103 notifies the communication terminal 102 of that effect (step S2124). Specifically, the CPU 402 of the cloud server 103 sends an HTTP response, in which an HTTP response status code indicating that the reception of the scan image has been completed is set, to the communication terminal 102.

Based on the HTTP response status code set in the received HTTP response data, the CPU 302 of the communication terminal 102 determines that the transmission of the scan image is successful. Based on this determination, the CPU 302 causes the display unit 310 to display the transmission success screen 1717 (step S2125), and ends the present process.

Figure 22:
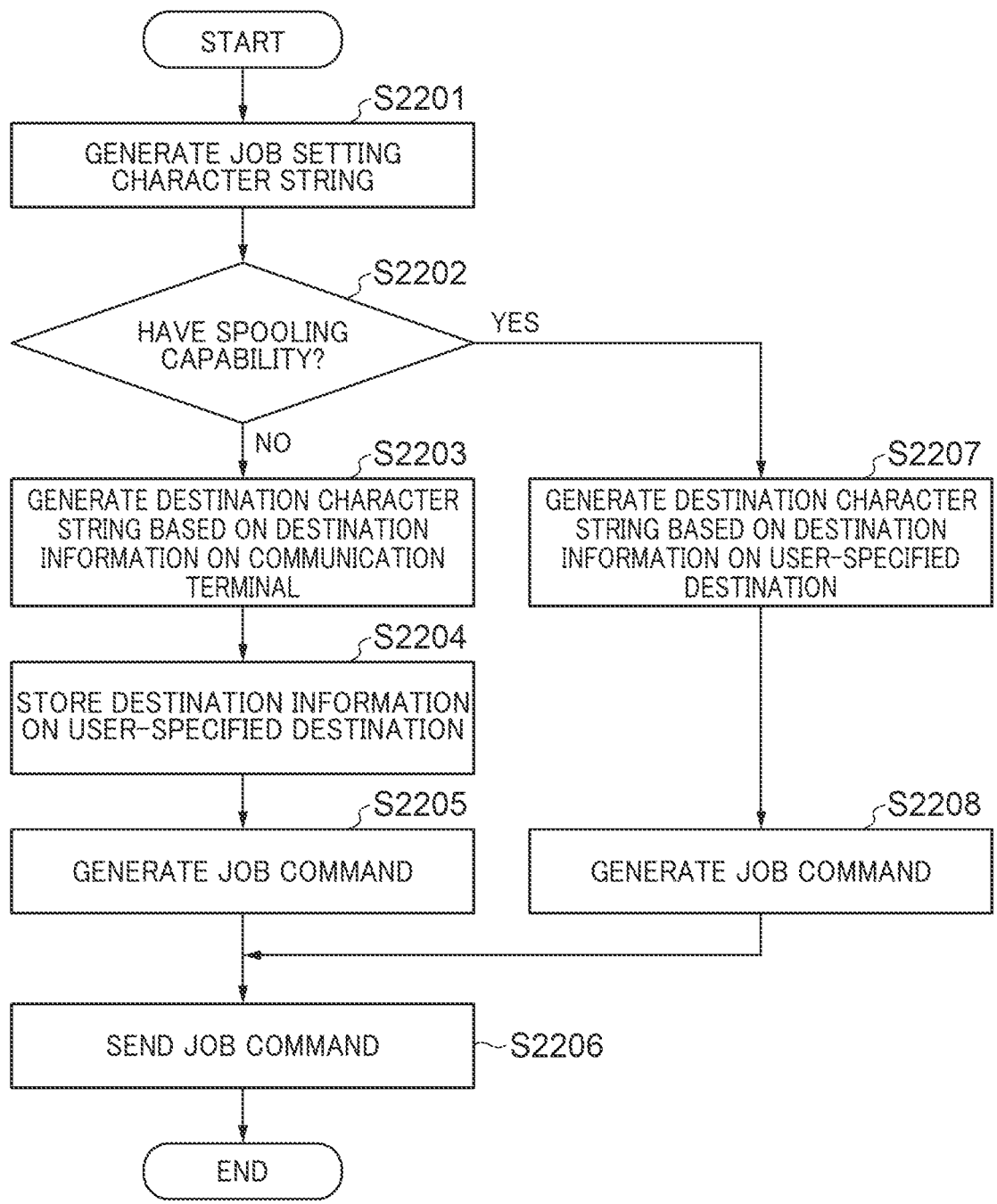
FIG. 22 is a flowchart showing the procedure of a job command generating process that is carried out by the communication terminal in the second embodiment.

FIG. 22 is a flowchart showing the procedure of a job command generating process that is carried out by the communication terminal 102 in the second embodiment. The job command generating process in FIG. 22 is implemented by the CPU 302 of the communication terminal 102 executing a program stored in the ROM 304 or the storage 305. The job command generating process in FIG. 22 is carried out when the user has issued an instruction to execute a scan job (refer to, for example, the step S1804 or S2104), that is, when the user depresses the scan start button 1708 on the scan setting screen 1703. It should be noted that at the start of the job command generating process, the spooling capability setting value for the image forming apparatus 101 obtained as a response to the device capability obtaining request in the step S1802 or S2102 has been stored in the RAM 303 of the communication terminal 102. As described above, the spooling capability setting value for the image forming apparatus 101 is "True" indicating that the image forming apparatus 101 "has spooling capability" or "False" indicating that the image forming apparatus 101 has "no spooling capability".

Referring to FIG. 22, the CPU 302 generates a job setting character string based on values selected in the color mode specification list box 1704, the resolution specification list box 1705, and the input method specification list box 1706 (step S2201). The CPU 302 stores the generated job setting character string in the RAM 303. Then, based on the spooling capability setting value for the image forming apparatus 101 stored in the RAM 303, the CPU 302 determines whether or not the image forming apparatus 101 "has spooling capability" (step S2202).

As a result of the determination in the step S2202, when the image forming apparatus 101 does not "have spooling capability", that is, when the image forming apparatus 101 has "no spooling capability", the job command generating process proceeds to step S2203. In the step S2203, the CPU 302 generates a destination character string based on the destination information on the communication terminal 102 and stores the generated destination character string in the RAM 303. Then, the CPU 302 stores the destination information on the user-specified destination into the RAM 303 (step S2204). Then, the CPU 302 generates the job command shown in FIG. 20B based on the job setting character string and the destination character string stored in the RAM 303 (step S2205). Namely, in this job command, destination information on the communication terminal 102, but not the destination information on the user-specified destination, is stored as destination information indicating a transmission destination of a scan image. Then, the CPU 302 sends the job command to the image forming apparatus 101 via the network I/F 306 (step S2206) (refer to, for example, the above-described step S1805 or S2108), and ends the present process.

As a result of the determination in the step S2202, when the image forming apparatus 101 "has spooling capability", the CPU 302 generates a destination character string based on the destination information on the user-specified destination and stores the destination character string in the RAM 303 (step S2207). Then, the CPU 302 generates the job command shown in FIG. 20A based on the job setting character string and the destination character string stored in the RAM 303 (step S2208). Namely, in this job command, the destination information on the user-specified destination is set as destination information indicating a transmission destination of a scan image. Then, the job command generating process proceeds to the step S2206.

Figure 23:
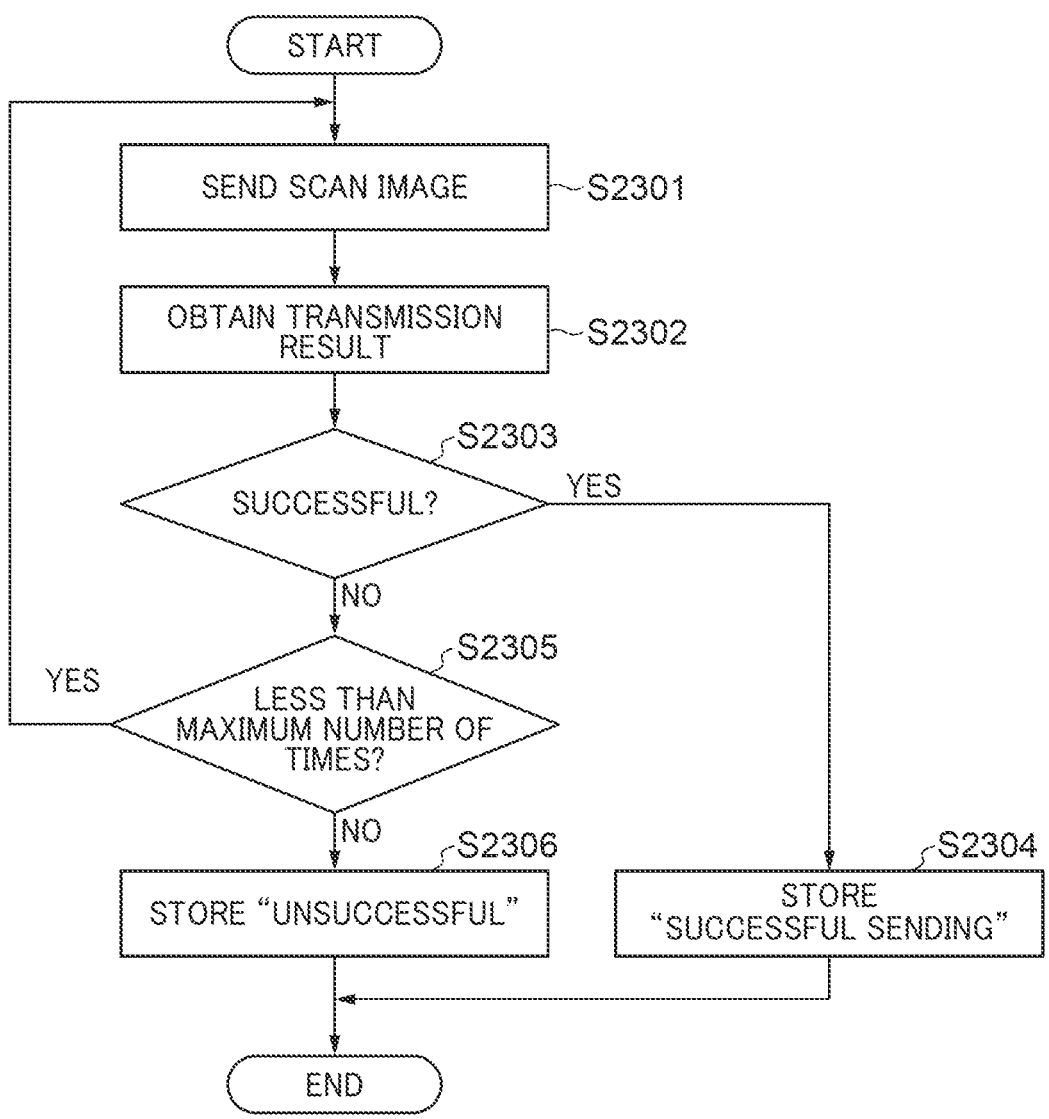
FIG. 23 is a flowchart showing the procedure of a job execution result storage process that is carried out by the image forming apparatus in the second embodiment.

FIG. 23 is a flowchart showing the procedure of a job execution result storage process that is carried out by the image forming apparatus 101 in the second embodiment. The job execution result storage process in FIG. 23 is implemented by the CPU 202 of the image forming apparatus 101 executing a program stored in the ROM 204 or the storage 205. The job execution result storage process in FIG. 23 is carried out after a scan image is generated based on scan job data generated in the step S1808 or S2109 described above. At the start of the job execution result storage process, binary data of a scan image has been stored in the RAM 203. In addition, at the start of the job execution result storage process, destination information set in a job command received from the communication terminal 102 has been stored in the RAM 203. This destination information includes a transmission destination URI that identifies a transmission destination of the scan image and transmission destination authentication information to be used for accessing the transmission destination. It is assumed that a maximum number of times the transmission of the scan image is retried, for example "5", as well as the number of retries, is stored in the RAM 203 of the image forming apparatus 101. It should be noted that the number of retries is reset to "0" at the start of a next job.

Referring to FIG. 23, the CPU 202 sends the scan image to a destination indicated by the destination information set in the job command received from the communication terminal 102 (step S2301). Specifically, an HTTPS POST request, which has an HTTP header to which the transmission destination authentication information stored in the RAM 203 is added and whose message body part is the binary data of the scan image stored in the RAM 203, is sent to the transmission destination URI stored in the RAM 203. For example, in a case where the image forming apparatus 101 has the spooling capability, the destination information on the cloud server 103, which is the user-specified destination, has been set in the job command by the job command generating process described above. In this case, the CPU 202 sends the scan image to the cloud server 103 in the step S2301. On the other hand, when the image forming apparatus 101 has no spooling capability, the destination information on the communication terminal 102 has been set in the job command by the job command generating process described above. In this case, the CPU 202 sends the scan image to the communication terminal 102 in the step S2301.

Then, the CPU 202 obtains an HTTPS response to the POST request from the transmission destination of the scan image and stores a transmission result included in the HTTPS response into the RAM 203 (step S2302). After that, the CPU 202 determines whether or not the transmission result stored into the RAM 203 in the step S2302 is "successful" (step S2303).

As a result of the determination in the step S2303, in a case where the transmission result stored into the RAM 203 in the step S2302 is "successful", the CPU 202 stores "successful sending" as a job execution result into the RAM 203 (step S2304), and ends the present process.

As a result of the determination in the step S2303, in a case where the transmission result stored into the RAM 203 in the step S2302 is not "successful", the CPU 202 determines whether or not the number of retries stored in the RAM 203 is less than the maximum number of times (step S2305).

As a result of the determination in the step S2305, in a case where the number of retries is less than the maximum number of times, the job execution result storage process returns to the step S2301. As a result of the determination in the step S2305, in a case where the number of retries is not less than the maximum number of times (that is, the maximum number of times has been reached), the CPU 202 stores "unsuccessful" as the job execution result into the RAM 203 (step S2306), and ends the present process. After that, upon receiving a status obtaining request from the communication terminal 102, the CPU 202 sends HTTP response data including the job execution result stored in the RAM 203 to the communication terminal 102.

Figure 24:
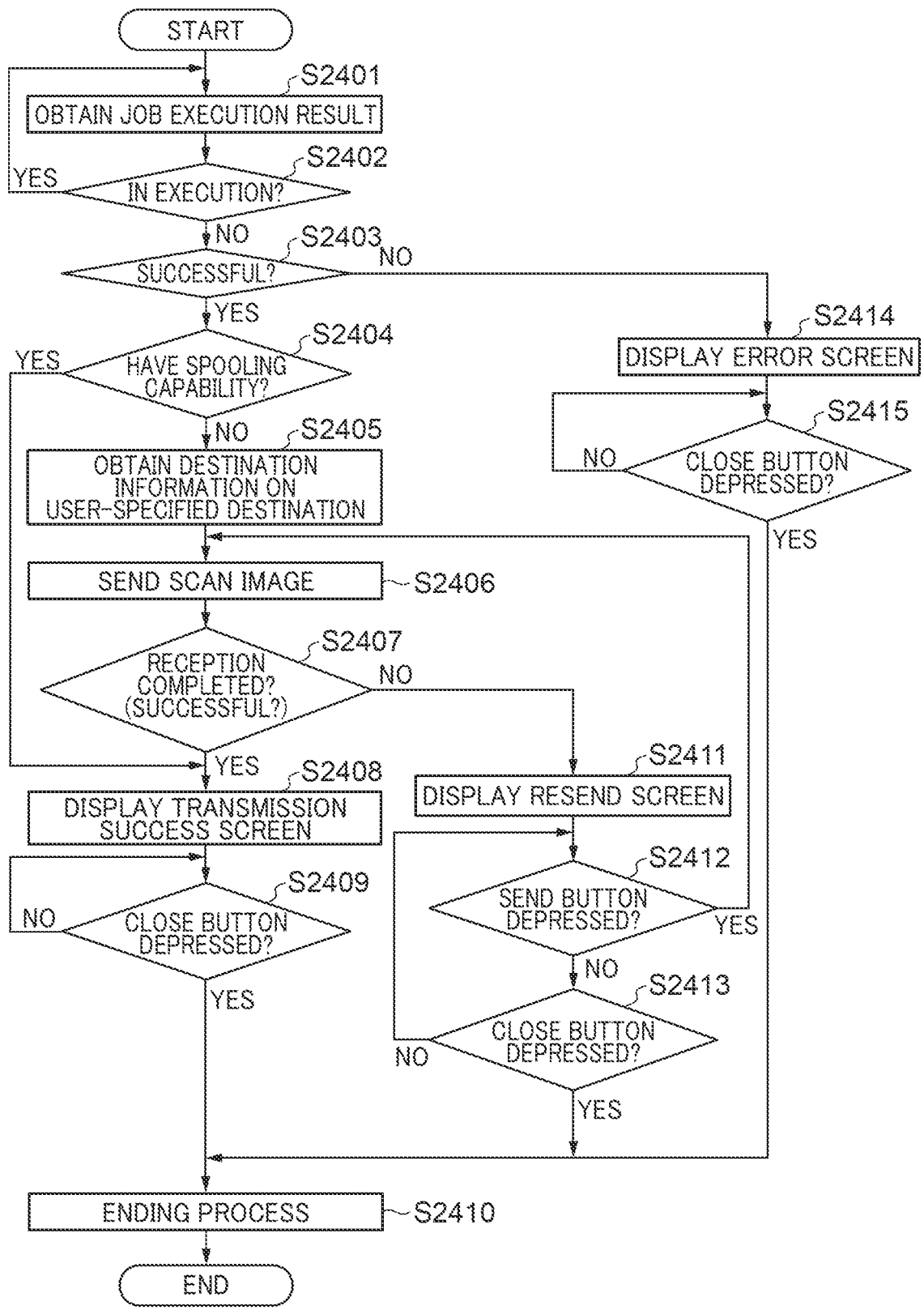
FIG. 24 is a flowchart showing the procedure of a communication terminal post-process that is carried out by the communication terminal in the second embodiment.

FIG. 24 is a flowchart showing the procedure of a communication terminal post-process that is carried out by the communication terminal 102 in the second embodiment. The communication terminal post-process in FIG. 24 is implemented by the CPU 302 of the communication terminal 102 executing a program stored in the ROM 304 or the storage 305. The communication terminal post-process in FIG. 24 is carried out when the image forming apparatus 101 sends HTTP response data including a job execution result as a response to a status obtaining request made by the communication terminal 102. At the start of the communication terminal post-process, a status obtaining request URI for issuing the status obtaining request to the image forming apparatus 101 and destination information on the cloud server 103, which is a user-specified destination, have been stored in the RAM 303. In addition, at the start of the communication terminal post-process, a spooling capability setting value for the image forming apparatus 101, which is obtained as a response to the device capability obtaining request in the step S1802 or S2102, has been stored in the RAM 303 of the communication terminal 102.

Referring to FIG. 24, the CPU 302 obtains the job execution result included in the HTTP response data sent from the image forming apparatus 101 (step S2401). Then, the CPU 302 determines whether or not the obtained job execution result is "in execution" (step S2402).

As a result of the determination in the step S2402, in a case where the obtained job execution result is "in execution", the communication terminal post-process returns to the step S2401. As a result of the determination in the step S2402, in a case where the obtained job execution result is not "in execution", the CPU 302 determines whether or not the obtained job execution result is "successful" (step S2403).

As a result of the determination in the step S2403, in a case where the obtained job execution result is "success", the communication terminal post-process proceeds to step S2404. In the step S2404, based on the spooling capability setting value for the image forming apparatus 101 stored in the RAM 302, the CPU 302 determines whether or not the image forming apparatus 101 "has spooling capability".

As a result of the determination in the step S2404, in a case where the image forming apparatus 101 "has spooling capability", the communication terminal post-process proceeds to step S2408 (to be described later). As a result of the determination in the step S2404, when the image forming apparatus 101 does not "have spooling capability", the communication terminal post-process proceeds to step S2405. In a case where the image forming apparatus 101 does not "have spooling capability", the scan image sent from the image forming apparatus 101 in the step S2114 described above has been stored in the storage 305. In this case, the CPU 302 obtains destination information on a user-specified destination, for example, destination information on the cloud server 103, from the RAM 303 (step S2405). Then, the CPU 302 sends the scan image stored in the storage 305 to the cloud server 103 via the network I/F 306 (step S2406) (refer to, for example, the step S2118 described above). After that, the CPU 302 obtains a response regarding the transmission of the scan image from the cloud server 103. Based on the obtained response, the CPU 302 determines whether or not the transmission result is "successful" (step S2407). Namely, the CPU 302 determines whether or not the reception of the scan image by the cloud server 103 has been completed.

As a result of the determination in the step S2407, in a case where the transmission result is "successful", the CPU 302 causes the display unit 310 to display the transmission success screen 1717 via the display unit I/F 308 (step S2408). The CPU 302 then stands by until the user depresses the close button 1718 on the transmission success screen 1717. When the user depresses the close button 1718 on the transmission success screen 1717 (YES in step S2409), the CPU 302 carries out an ending process, which is the same as the process in the step S1511 (step S2410). After that, the communication terminal post-process is ended.

As a result of the determination in the step S2407, in a case where the transmission result is not "successful", the CPU 302 causes the display unit 310 to display the resend screen 1711 via the display unit I/F 308 (step S2411). Then, the CPU 302 determines whether or not the user has depressed the send button 1713 on the resend screen 1711 (step S2412).

In a case where the result of the determination in the step S2412 is positive (YES), that is, in a case where the user has depressed the send button 1713 on the resend screen 1711, the communication terminal post-process proceeds to the step S2406. In a case where the result of the determination in the step S2412 is negative (NO), that is, in a case where the user has not depressed the send button 1713 on the resend screen 1711, the CPU 302 determines whether or not the user has depressed the close button 1714 on the resend screen 1711 (step S2413).

In a case where the result of the determination in the step S2413 is negative (NO), that is, in a case where the user has not depressed the close button 1714 on the resend screen 1711, the communication terminal post-process returns to the step S2412. In a case where the result of the determination in the step S2413 is positive (YES), that is, in a case where the user has depressed the close button 1714 on the resend screen 1711, the communication terminal post-process proceeds to the step S2410.

As a result of the determination in the step S2403, in a case where the obtained job execution result is not "successful", the CPU 302 causes the display unit 310 to display the error screen 1715 via the display unit I/F 308 (step S2414). The CPU 302 then stands by until the user depresses the close button 1716 on the error screen 1715. When the user depresses the close button 1716 on the error screen 1715 (YES in step S2415), the communication terminal post-process proceeds to the step S2410.

In the embodiment described above, in a case where the image forming apparatus 101 has no spooling capability, the communication terminal 102 sends the job command that does not include the destination information on the user-specified destination, but includes the destination information on the communication terminal 102, to the image forming apparatus 101. Thus, this makes it possible to retry the transmission of the scan image from the communication terminal 102 without the scan image being accumulated in the storage 205 of the image forming apparatus 101 having no spooling capability. As a result, the transmission of the scan image can be retried without the execution of other jobs in the image forming apparatus 101 being restricted.

Moreover, in the embodiment described above, the image forming apparatus with no spooling capability is an image forming apparatus equipped with the storage 205 having such a small storage capacity that it cannot store all scan images generated by executing a job. With the arrangement of the embodiment described above, in an image forming apparatus having the storage 205 that has such a small storage capacity that all scan images generated by executing a job cannot be stored, the transmission of the scan image can be retried through the communication terminal 102.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-084037, filed May 18, 2021, which is hereby incorporated by reference wherein in its entirety.

What is claimed is:

1. An image processing system that has an information processing apparatus and an image processing apparatus, the image processing system comprising:
   at least one memory that stores a set of instructions; and
   at least one processor that is configured to, based on the instructions, cause the information processing apparatus to:
      receive, from a user, an instruction to execute a job which reads an original, generates image data of the original, and sends the image data to a destination specified by the user;
      generate a command for executing the job; and
      send the command to the image processing apparatus, and
   the image processing apparatus to:
      control execution of the job based on the command received from the information processing apparatus; and
      when sending of the image data to the destination specified by the user is unsuccessful, send the image data to the information processing apparatus, wherein, when the sending of the image data to the destination specified by the user is unsuccessful and the image processing apparatus sends the image data to the information processing apparatus, the information processing apparatus displays a screen including an input receiver for resending, when the input receiver receives an input from the user, the image data received from the image processing apparatus to the destination specified by the user without requiring input of the destination.

2. The image processing system according to claim 1, wherein the command includes first destination information required to send the image data to the destination specified by the user and second destination information required to send the image data to the information processing apparatus.

3. The image processing system according to claim 1, wherein after receiving the image data from the image processing apparatus, in accordance with reception of a job result notification which indicates that transmission of the image data from the image processing apparatus to the information processing apparatus has been completed, the information processing apparatus displays the screen.

4. The image processing system according to claim 3, wherein the screen displays an error message indicating that the image processing apparatus is unsuccessful in sending of the image data to the destination specified by the user.

5. The image processing system according to claim 3, wherein when sending of the image data to the destination specified by the user is successful, the image processing apparatus sends, to the information processing apparatus, another job result notification indicating that the image processing apparatus has completed transmission of the image data to the destination specified by the user.

6. A control method for an image processing system that has an information processing apparatus and an image processing apparatus, the control method comprising:
   receiving, from a user, an instruction to execute a job which reads an original, generates image data of the original, and sends the image data to a destination specified by the user;
   causing the information processing apparatus to generate a command for executing the job;
   sending the command to the image processing apparatus;
   causing the image processing apparatus to execute the job based on the command;
   causing, when sending of the image data to the destination specified by the user is unsuccessful, the image processing apparatus to send the image data to the information processing apparatus; and
   causing, when the sending of the image data to the destination specified by the user is unsuccessful and the image processing apparatus sends the image data to the information processing apparatus, the information processing apparatus to display a screen including an input receiver for resending, when the input receiver receives an input from the user, the image data received from the image processing apparatus to the destination specified by the user without requiring input of the destination.

7. A non-transitory storage medium storing a computer-executable program for executing a control method for an image processing system that has an information processing apparatus and an image processing apparatus,
   the control method comprising:
   receiving, from a user, an instruction to execute a job which reads an original, generates image data of the original, and sends the image data to a destination specified by the user;
   causing the information processing apparatus to generate a command for executing the job;
   sending the command to the image processing apparatus;
   causing the image processing apparatus to execute the job based on the command;
   causing, when sending of the image data to the destination specified by the user is unsuccessful, the image processing apparatus to send the image data to the information processing apparatus; and
   causing, when the sending of the image data to the destination specified by the user is unsuccessful and the image processing apparatus sends the image data to the information processing apparatus, the information processing apparatus to display a screen including an input receiver for resending, when the input receiver receives an input from the user, the image data received from the image processing apparatus to the destination specified by the user without requiring input of the destination.

* * * * *